US009001433B2

(12) United States Patent
Toyama et al.

(10) Patent No.: US 9,001,433 B2
(45) Date of Patent: Apr. 7, 2015

(54) ZOOM LENS AND IMAGING APPARATUS

(71) Applicant: FUJIFILM Corporation, Tokyo (JP)

(72) Inventors: Nobuaki Toyama, Saitama-ken (JP); Michio Cho, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/269,343

(22) Filed: May 5, 2014

(65) Prior Publication Data

US 2014/0240848 A1 Aug. 28, 2014

Related U.S. Application Data

(63) Continuation of application No. PCT/JP2012/006979, filed on Oct. 31, 2012.

(30) Foreign Application Priority Data

Nov. 4, 2011 (JP) ................... 2011-242311

(51) Int. Cl.
*G02B 15/14* (2006.01)
*G02B 15/177* (2006.01)
*G02B 13/18* (2006.01)
*G02B 15/17* (2006.01)

(52) U.S. Cl.
CPC .............. *G02B 15/177* (2013.01); *G02B 13/18* (2013.01); *G02B 15/17* (2013.01)

(58) Field of Classification Search
CPC ....... G02B 15/177; G02B 15/17; G02B 13/18
USPC ................................ 359/688, 686
See application file for complete search history.

(56) References Cited

U.S. PATENT DOCUMENTS

| 4,099,845 | A | 7/1978 | Takesi et al. |
| 5,757,554 | A | 5/1998 | Fukami |

(Continued)

FOREIGN PATENT DOCUMENTS

| JP | 59-004686 | 1/1984 |
| JP | 06-242378 | 9/1994 |
| JP | 09-015501 | 1/1997 |
| JP | 10-062686 | 3/1998 |
| JP | 2000-321496 | 11/2000 |
| JP | 2001-116993 | 4/2001 |

(Continued)

OTHER PUBLICATIONS

International Search Report, PCT/JP2012/006979, Dec. 18, 2012.

(Continued)

*Primary Examiner* — David N Spector
(74) *Attorney, Agent, or Firm* — Young & Thompson

(57) ABSTRACT

A zoom lens includes first, second, third, and fourth lens groups respectively having positive, negative, negative, and positive powers. The first lens group includes a first lens subgroup having a negative power, which is fixed while focusing, a second lens subgroup having a positive power, which moves while focusing, and a third lens subgroup having a positive power, which is fixed while focusing. The second lens subgroup includes a positive lens having a surface having a radius of curvature with a smaller absolute value toward the image side; and a cemented lens constituted by a negative lens toward the object side and a positive lens toward the image side, cemented together at a joint surface having a convex surface toward the object side. The focal distance f12 of the second lens subgroup and the focal length fw of the entire system at the wide angle end satisfy the relationship: $3.0 < f12/fw < 20.0$.

15 Claims, 19 Drawing Sheets

(56) References Cited

U.S. PATENT DOCUMENTS

| | | |
|---|---|---|
| 5,966,246 A | 10/1999 | Yoshikawa |
| 6,512,637 B1 | 1/2003 | Tomita |
| 2003/0007256 A1 | 1/2003 | Usui et al. |
| 2009/0034097 A1 | 2/2009 | Yakita |
| 2009/0046375 A1 | 2/2009 | Wakazono et al. |
| 2010/0238566 A1 | 9/2010 | Inomoto et al. |

FOREIGN PATENT DOCUMENTS

| | | |
|---|---|---|
| JP | 2009-036844 | 2/2009 |
| JP | 2009-042346 | 2/2009 |
| JP | 2010-217735 | 9/2010 |

OTHER PUBLICATIONS

Japanese Official Action—2013-541630—Jul. 1, 2014.

FIG.3
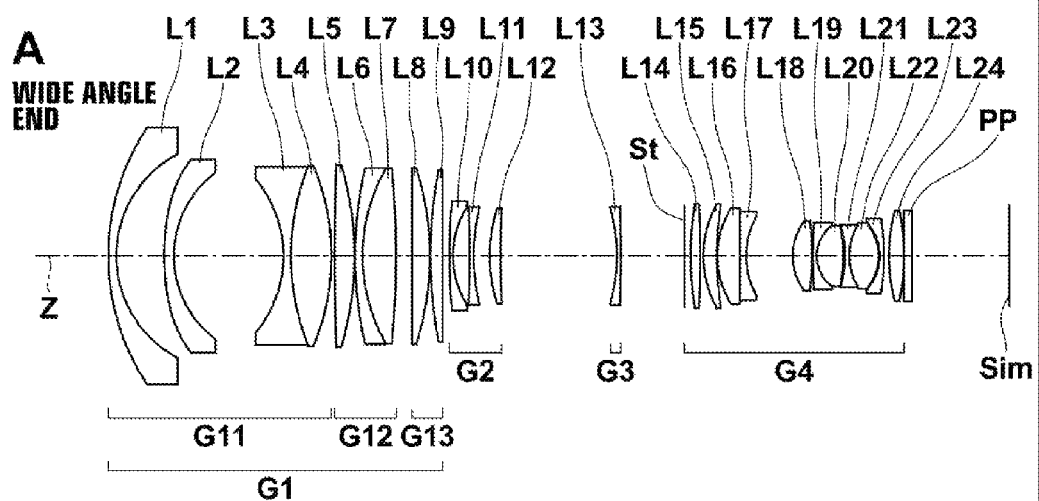
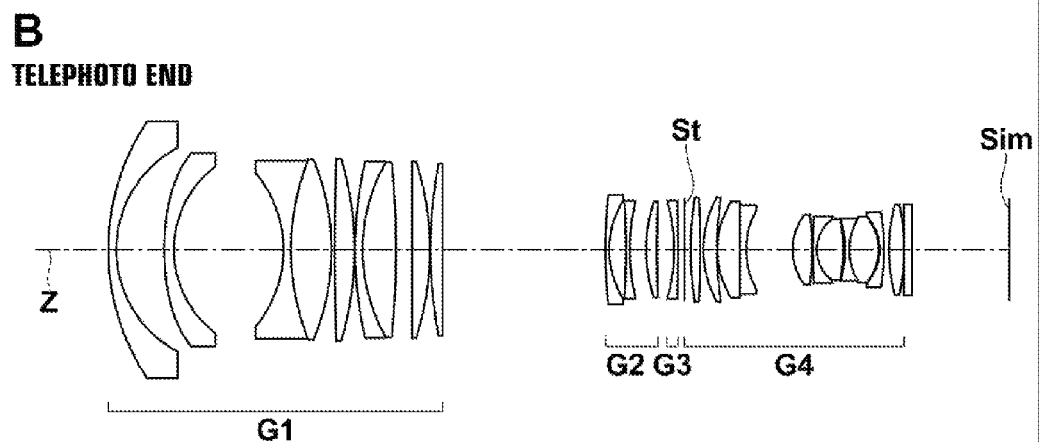

FIG.6
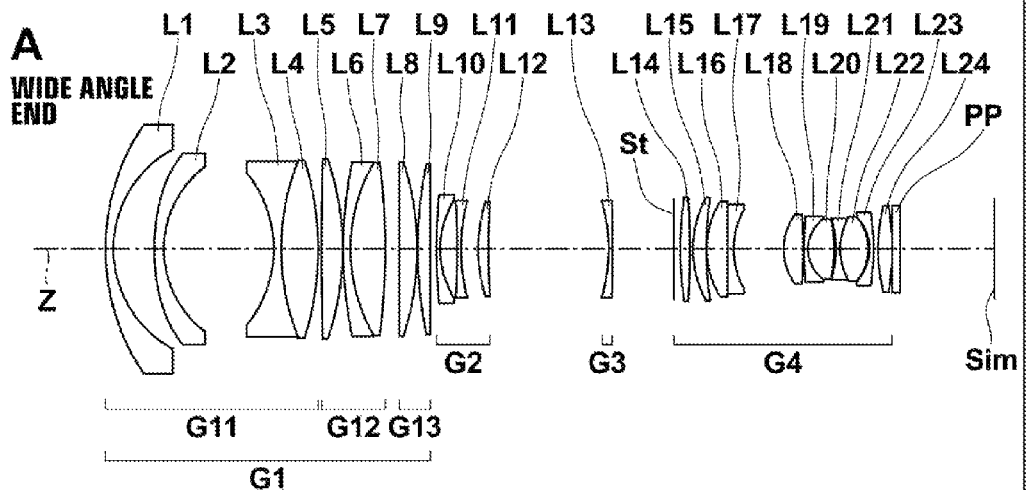
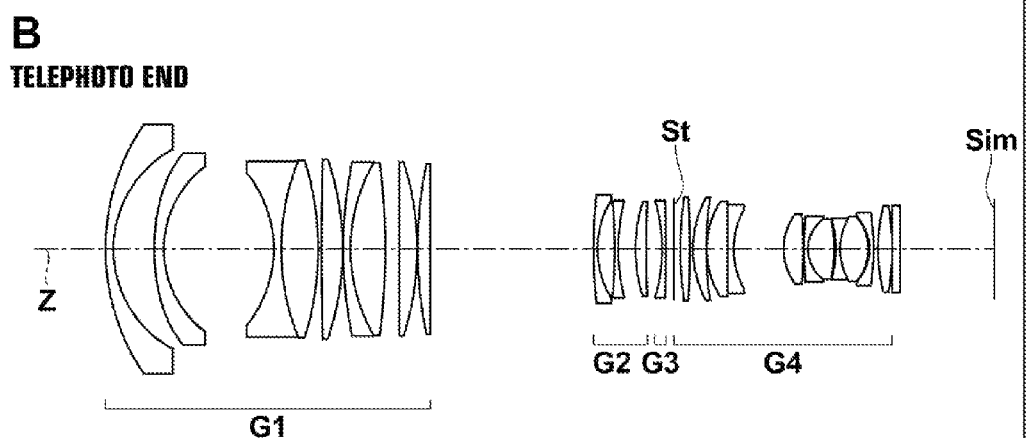

ZOOM LENS AND IMAGING APPARATUS

TECHNICAL FIELD

The present invention is related to a zoom lens. Particularly, the present invention is related to a zoom lens which can be favorably employed in imaging apparatuses such as electronic cameras.

In addition, the present invention is related to an imaging apparatus equipped with such a zoom lens.

RELATED ART

Zoom lenses are often mounted on imaging apparatuses, such as digital cameras, digital cinema cameras, video cameras, broadcast cameras, and surveillance cameras. Among such imaging apparatuses, there is particular demand for broadcast cameras and digital cinema cameras to have wide angles of view and to suppress variations in angles of view during focusing operations. Various zoom lenses have been conventionally proposed in order to meet this demand.

For example, Japanese Unexamined Patent Publication Nos. 6(1994)-242378, 9(1997)-015501, 10(1998)-062686, and Japanese Patent Publication No. 59(1984)-004686 disclose zoom lenses in which a first group lens is divided into a first lens subgroup having a negative refractive power, a second lens subgroup having a positive refractive power, and a third lens subgroup having a positive refractive power. These zoom lenses are configured such that focusing operations are performed by moving only the second lens subgroup.

DISCLOSURE OF THE INVENTION

However, the objectives of the conventional zoom lenses disclosed in Japanese Unexamined Patent Publication Nos. 6(1994)-242378, 9(1997)-015501, and 10(1998)-062686 are to achieve high variable magnification ratios. It cannot be said that the first lens group of these zoom lenses are sufficiently miniaturized, although image sizes to be imaged are not particularly large. Recently, there has been a particular increase in demand for portable broadcast lenses. Therefore, compact and light weight zoom lenses having large image sizes are desired. However, the aforementioned conventional lenses cannot sufficiently meet this demand.

Although neither the angle of view nor the F number are described for the conventional zoom lens disclosed in Japanese Patent Publication No. 59(1984)-004686, it cannot be said that this zoom lens has a sufficiently wide angle of view, taking the examples of numerical values thereof into consideration.

The present invention has been developed in view of the foregoing circumstances. It is an object of the present invention to provide a zoom lens having a wide angle of view that can suppress variations in angles of view while changing magnification, and further achieves sufficient reductions in size and weight, as well as high performance.

A zoom lens of the present invention substantially consists of:

a first lens group having a positive refractive power, which is fixed while changing magnification;

a second lens group having a negative refractive power, which moves from an object side to an image side while changing magnification from a wide angle end to a telephoto end;

a third lens group having a negative refractive power, which corrects movement of an imaging surface while changing magnification; and a fourth lens group having a positive refractive power, which is fixed while changing magnification, provided in this order from the object side;

the first lens group substantially consisting of: a first lens subgroup having a negative refractive power, which is fixed during focusing operations; a second lens subgroup having a positive refractive power, which moves during focusing operations; and a third lens subgroup having a positive refractive power, which is fixed during focusing operations, provided in this order from the object side;

the second lens subgroup substantially consisting of: a positive lens (a lens having a positive refractive power) having a surface having a radius of curvature with a smaller absolute value toward the image side; and a cemented lens constituted by a negative lens (a lens having a negative refractive power) toward the object side and a positive lens toward the image side, cemented together at a joint surface having a convex surface toward the object side, provided in this order from the magnification side;

the second lens subgroup satisfying the following conditional formula:

$$3.0 < f12/fw < 20.0 \quad (1)$$

wherein f12 is the focal length of the second lens subgroup, and fw is the focal length of the entire system at the wide angle end.

Note the expression "substantially consists of . . . " stated three times above means that the zoom lens may lens may also include other components, such as lenses that practically do not have any power, optical elements other than lenses such as aperture stops and cover glass, and mechanical components such as lens flanges, a lens barrel, an imaging device, and a blur correcting mechanism.

In addition, the surface shapes and the signs of refractive powers of the lenses of the zoom lens of the present invention will be those in the paraxial regions for lenses that include aspherical surfaces.

It is particularly desirable for the zoom lens of the present invention to satisfy the following conditional formula within the range defined by Conditional Formula (1).

$$4.0 < f12/fw < 10.0 \quad (1)'$$

It is desirable for the zoom lens of the present invention to satisfy the following conditional formula:

$$-5.0 < f11/fw < -0.5 \quad (2)$$

wherein f11 is the focal length of the first lens subgroup, and fw is the focal length of the entire system at the wide angle end.

Further, it is particularly desirable for the following conditional formula to be satisfied within the range defined by Conditional Formula (2).

$$-3.0 < f11/fw < -1.2 \quad (2)'$$

In the zoom lens of the present invention, it is desirable for the first lens subgroup to substantially consist of: a negative meniscus lens having a concave surface toward the image side; a negative meniscus lens having a concave surface toward the image side; and a cemented lens constituted by a biconcave lens toward the object side and a biconvex lens toward the image side which are cemented together, provided in this order from the object side (hereinafter, referred to as the basic configuration of the first lens subgroup).

In the case that the first lens subgroup of the zoom lens of the present invention has the basic configuration described above, it is desirable for following conditional formula to be satisfied:

$$0.60 < D4/f1 < 2.0 \quad (3)$$

wherein D4 is the distance (a spatial distance along the optical axis) between the surfaces of the second negative meniscus lens from the object side within the first lens subgroup and the cemented lens within the first lens subgroup, and f1 is the focal length of the first lens group.

Further, it is desirable for the following conditional formula to be satisfied within the range defined by Conditional Formula (3).

$$0.70 < D4/f1 < 1.0 \quad (3)'$$

In the case that the first lens subgroup of the zoom lens of the present invention has the basic configuration described above, it is desirable for following conditional formula to be satisfied:

$$-1.0 < (R5-R7)/(R5+R7) < -0.1 \quad (4)$$

wherein R5 is the radius of curvature of the surface of the cemented lens within the first lens subgroup toward the object side, and R7 is the radius of curvature of the surface of the cemented lens within the first lens subgroup toward the image side.

Further, it is particularly desirable for the following conditional formula to be satisfies within the range defined by Conditional Formula (4).

$$-0.8 < (R5-R7)/(R5+R7) < -0.25 \quad (4)'$$

In the case that the first lens subgroup of the zoom lens of the present invention has the basic configuration described above, it is desirable for following conditional formula to be satisfied:

$$20.0 < \nu d2 < 35.0 \quad (5)$$

wherein $\nu d2$ is the Abbe's number of the second negative meniscus lens with respect to the d line.

Further, it is particularly desirable for the following conditional formula to be satisfied within the range defined in Conditional Formula (5).

$$22.0 < \nu d2 < 32.0 \quad (5)'$$

In the case that the first lens subgroup of the zoom lens of the present invention has the basic configuration described above, it is desirable for following conditional formula to be satisfied:

$$35.0 < \nu d4 < 100.0 \quad (6)$$

wherein $\nu d4$ is the Abbe's number of the biconvex lens that forms the cemented lens within the first lens subgroup with respect to the d line.

Further, it is particularly desirable for the following conditional formula to be satisfied within the range defined in Conditional Formula (6).

$$40.0 < \nu d4 < 72.0 \quad (6)'$$

Still further, it is more particularly desirable for the following conditional formula to be satisfied within the range defined in Conditional Formula (6)'.

$$40.0 < \nu d4 < 60.0 \quad (6)''$$

Meanwhile, an imaging apparatus of the present invention is characterized by being equipped with the zoom lens of the present invention.

The zoom lens of the present invention is of the four group configuration described above. The first lens group substantially consists of: the first lens subgroup having a negative refractive power which is fixed during focusing operations; the second lens subgroup having a positive refractive power which moves during focusing operations; and the third lens subgroup having the positive refractive power which is fixed during focusing operations, provided in this order from the magnification side. Therefore, variations in the angles of view during focusing operations can be suppressed, as described in Japanese Patent Publication No. 59(1984)-004686.

Further, in the zoom lens of the present invention, the second lens subgroup substantially consists of: the positive lens having a surface having a radius of curvature with a smaller absolute value toward the image side; and the cemented lens constituted by the negative lens toward the object side and the positive lens toward the image side, cemented together at a joint surface having a convex surface toward the object side, provided in this order from the magnification side. Therefore, it becomes possible to suppress variations in aberrations due to focusing operations. Particularly by the joint surface being oriented as described above, an advantageous effect, that variations in lateral chromatic aberration and astigmatism during focusing can be suppressed, becomes significant.

Further, the zoom lens of the present invention satisfies Conditional Formula (1), and therefore the following advantageous effect can be obtained. That is, Conditional Formula (1) defines the ratio between the focal length of the entire system at the wide angle end and the focal length of the second lens subgroup. If the value of f12/fw is less than the lower limit defined in Conditional Formula (1), the refractive power of the second lens subgroup will become excessively great, and the amount of variations in aberrations due to focusing operations will become great. Inversely, if the value of f12/fw is greater than the upper limit defined in Conditional Formula (1), a large amount of space will become necessary to perform focusing operations from an infinitely far distance to a close distance. In addition, the diameters of the lenses within the first lens subgroup and the second lens subgroup will increase, resulting in reductions in size and weight becoming difficult. The above shortcomings can be prevented in the case that Conditional Formula (1) is satisfied. If Conditional Formula (1) is satisfied, reductions in the size and weight of the zoom lens can be achieved, and variations in the amount of aberrations due to focusing operations can be suppressed.

The advantageous effects described above will become more significant in the case that Conditional Formula (1)' is satisfied within the range defined in Conditional Formula (1).

In the case that the zoom lens of the present invention satisfies Conditional Formula (2), the following advantageous effects are obtained. That is, Conditional Formula (2) defines the ratio between the focal distance of the entire system at the wide angle end and the focal distance of the first lens subgroup. If the value of f11/fw is less than the lower limit defined in Conditional Formula (2), a large amount of space will become necessary to perform focusing operations from an infinitely far distance to a close distance. In addition, the diameters of the lenses that constitute the first lens subgroup and the second lens subgroup will increase, and it will become difficult to reduce the size and weight of the zoom lens. Inversely, if the value of f11/fw is greater than the upper limit defined in Conditional Formula (2), the refractive power of the first lens subgroup will become excessively great, resulting in increases in the amount of distortion at the wide angle end and the amount of spherical aberration at the telephoto end. The above shortcomings can be prevented in the case that Conditional Formula (2) is satisfied. If Conditional Formula (2) is satisfied, reductions in the size and the weight of the zoom lens can be achieved, while the amount of distortion at the wide angle end and the amount of spherical aberration at the telephoto end can be suppressed.

The advantageous effects described above will become more significant in the case that Conditional Formula (2)' is satisfied within the range defined in Conditional Formula (2).

In addition, in the case that the first lens subgroup in zoom lens of the present invention has the basic configuration described above, the diameters of the lenses that constitute first lens subgroup can be decreased, and high order spherical aberration at the telephoto end can be suppressed.

In the case that the first lens subgroup in zoom lens of the present invention has the basic configuration described above and Conditional Formula (3) is satisfied, the following advantageous effects can be obtained. That is, Conditional Formula (3) defines the ratio between the focal distance of the first lens group and the distance between the aforementioned surfaces within the first lens subgroup (the distance between the surfaces of the second negative meniscus lens from the object side and the cemented lens). If the value of D4/f1 is less than the lower limit defined in Conditional Formula (3), field curvature will tend to be present toward the lower side of images. If such field curvature is corrected by other lens groups, high order field curvature will be generated, which is difficult to correct. Inversely, if the value of D4/f1 is greater than the upper limit defined in Conditional Formula (3), field curvature will tend to be present toward the upper side of images. If such field curvature is corrected by other lens groups, high order field curvature will be generated, which is difficult to correct. The above shortcomings can be prevented if Conditional Formula (3) is satisfied, and it will be possible to favorably correct field curvature.

The advantageous effect described above will become more significant in the case that Conditional Formula (3)' is satisfied within the range defined in Conditional Formula (3).

In the case that the first lens subgroup in zoom lens of the present invention has the basic configuration described above and Conditional Formula (4) is satisfied, the following advantageous effects can be obtained. That is, Conditional Formula (4) defines the relationship between the radius of curvature of the surface toward the object side and the surface toward the image side of the cemented lens within the first lens subgroup. If the value of (R5−R7)/(R5+R7) is less than the lower limit defined in Conditional Formula (4), field curvature will tend to be present toward the lower side of images, which is difficult to correct. Inversely, if the value of (R5−R7)/(R5+R7) is greater than the upper limit defined in Conditional Formula (4), high order field curvature will be generated, which is difficult to correct. The above shortcomings can be prevented if Conditional Formula (4) is satisfied, and it will be possible to favorably correct field curvature.

The advantageous effect described above will become more significant in the case that Conditional Formula (4)' is satisfied within the range defined in Conditional Formula (4).

In the case that the first lens subgroup in zoom lens of the present invention has the basic configuration described above and Conditional Formula (5) is satisfied, the following advantageous effects can be obtained. That is, Conditional Formula (5) defines the Abbe's number of the second negative meniscus lens within the first lens subgroup. If the value of υd2 is less than the lower limit defined in Conditional Formula (5), the amount of lateral chromatic aberration at the wide angle end becomes great. Inversely, if the value of υd2 is greater than the upper limit defined in Conditional Formula (5), the specific weight of the second negative meniscus lens will become great, and the weight of the zoom lens will increase. The above shortcomings can be prevented in the case that Conditional Formula (5) is satisfied, lateral chromatic aberration can be suppressed at the wide angle end, and weight reduction of the zoom lens can also be realized. The second negative meniscus lens is a lens having a particularly large diameter within the entire system. Therefore, employing a glass material having a low specific weight is extremely advantageous from the viewpoint of weight reduction of the zoom lens.

The advantageous effects described above will become more significant in the case that Conditional Formula (5)' is satisfied within the range defined in Conditional Formula (5).

In the case that the first lens subgroup in zoom lens of the present invention has the basic configuration described above and Conditional Formula (6) is satisfied, the following advantageous effects can be obtained. That is, Conditional Formula (6) defines the Abbe's number of the biconvex lens that constitutes the cemented lens within the first lens subgroup. If the value of υd4 is less than the lower limit defined in Conditional Formula (6), the amount of lateral chromatic aberration will increase. If this lateral chromatic aberration is to be corrected by the other lens groups, the Abbe's numbers of the other lenses, for example, the Abbe's number of the second negative meniscus lens, will increase, which will result in glass materials having high specific weights being used, leading to an increase in the weight increase of the zoom lens. Inversely, if the value of υd4 is greater than the upper limit defined in Conditional Formula (6), the amount of lateral chromatic aberration will increase, and correction thereof will become difficult. The above shortcomings can be prevented if Conditional Formula (6) is satisfied, and weight reduction of the zoom lens can be realized while suppressing the amount of lateral chromatic aberration.

The advantageous effects described above will become more significant in the case that Conditional Formula (6)' is satisfied, and further in the case that Conditional Formula (6)" is satisfied within the range defined in Conditional Formula (6).

Meanwhile, the imaging apparatus according to the present invention is equipped with the zoom lens of the present invention that exhibits the advantageous effects described above. Therefore, the imaging apparatus of the present invention can prevent variations in the angle of view during focusing operations, suppress variations in various aberrations during focusing operations, is capable of imaging at high image quality, and can achieve reductions in size and weight.

BRIEF DESCRIPTION OF THE DRAWINGS

FIG. 3 is a collection of diagrams that illustrate the lens configuration of a zoom lens according to Example 3 of the present invention.

FIG. 6 is a collection of diagrams that illustrate the lens configuration of a zoom lens according to Example 6 of the present invention.

Figure 10:
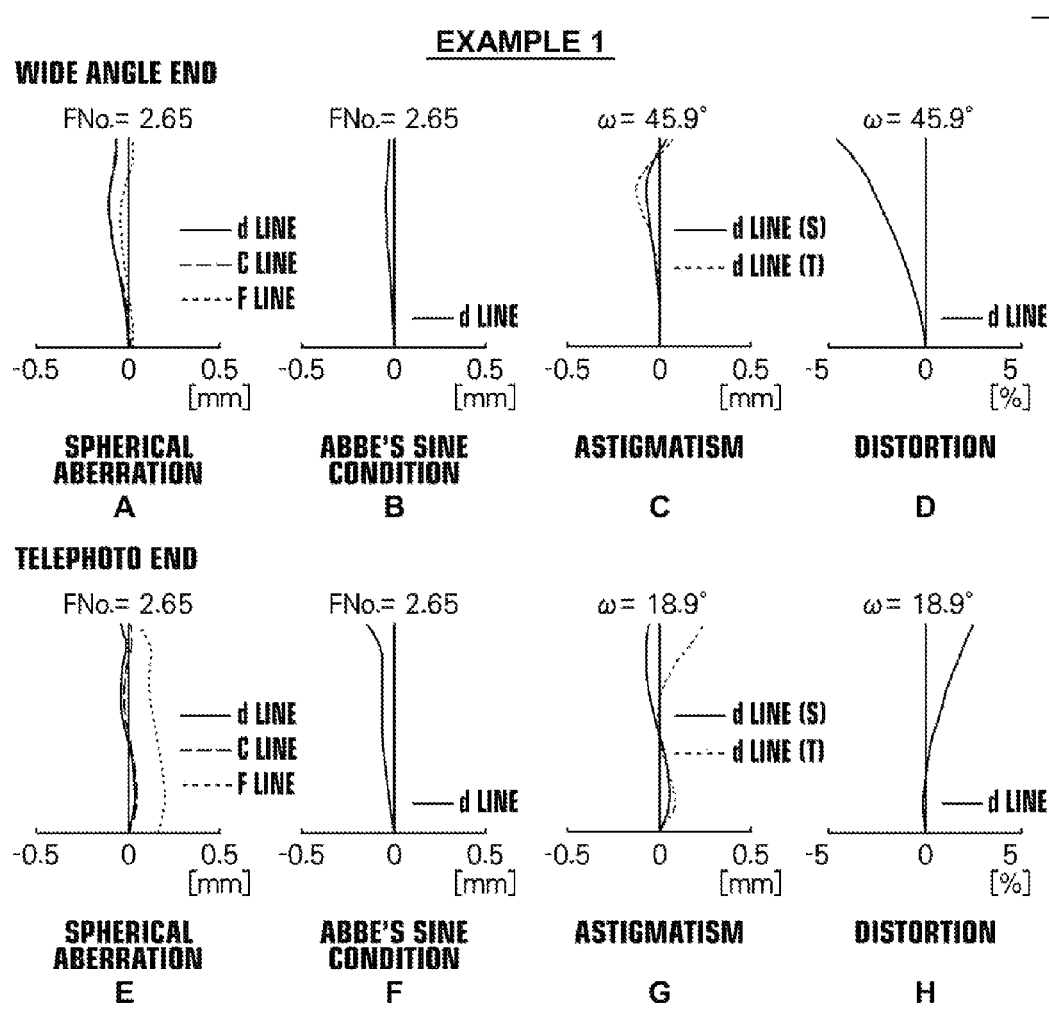

A through H of FIG. 10 are diagrams that illustrate various aberrations of the zoom lens according to Example 1 of the present invention.

Figure 11:
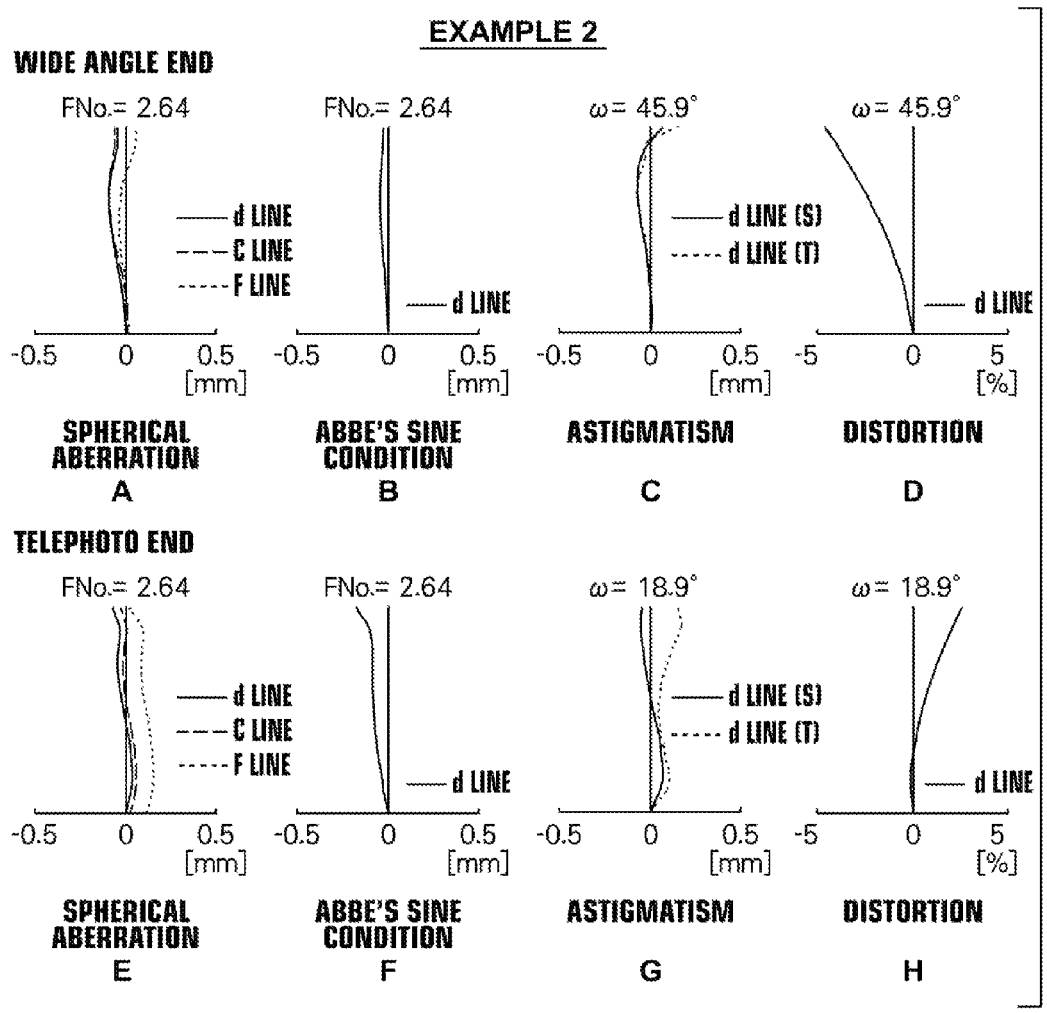

A through H of FIG. 11 are diagrams that illustrate various aberrations of the zoom lens according to Example 2 of the present invention.

Figure 12:
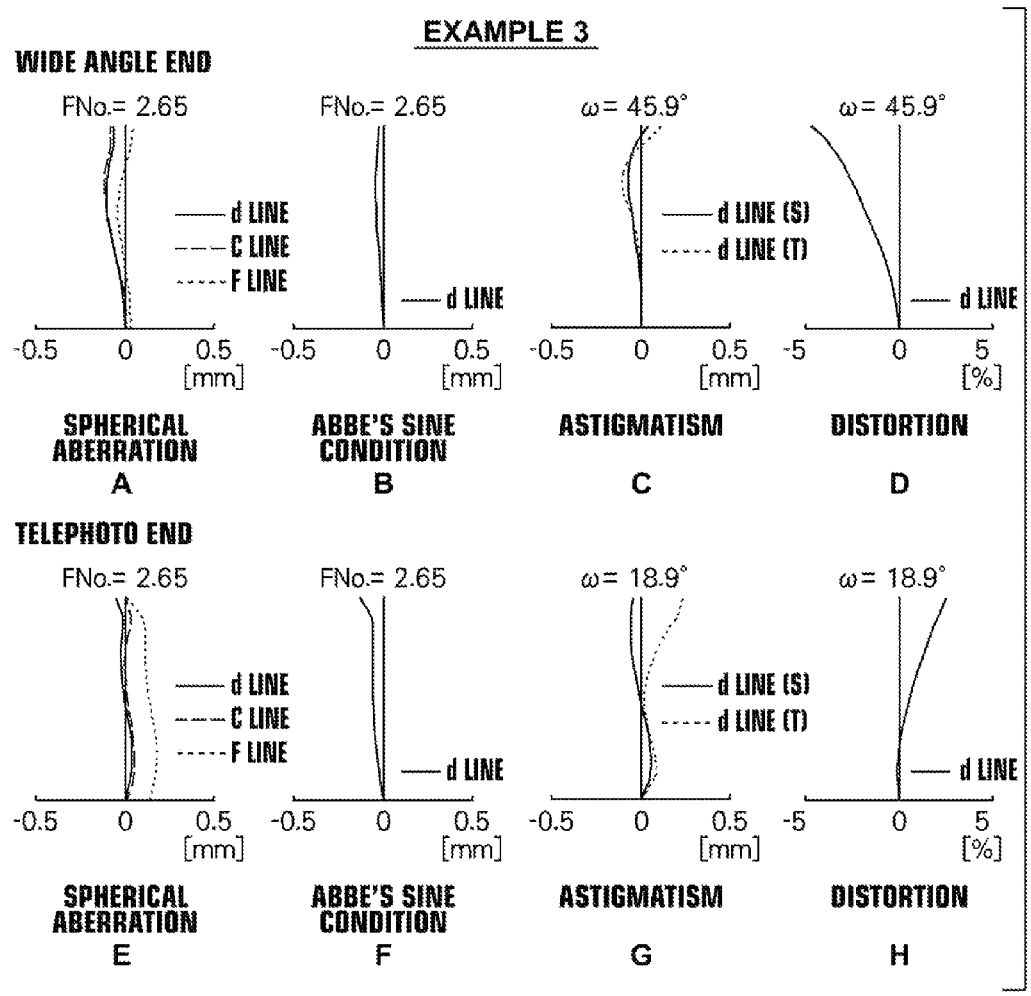

A through H of FIG. 12 are diagrams that illustrate various aberrations of the zoom lens according to Example 3 of the present invention.

Figure 13:
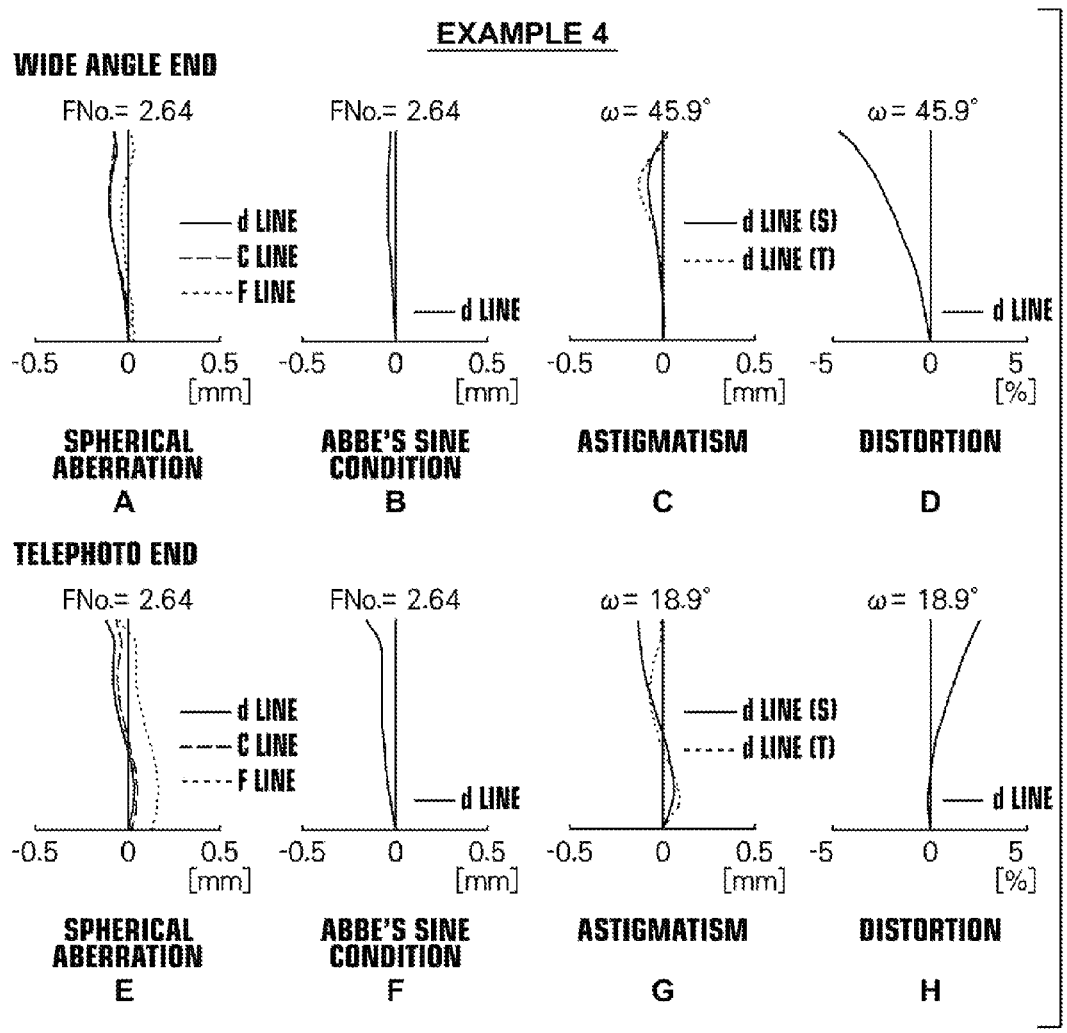

A through H of FIG. 13 are diagrams that illustrate various aberrations of the zoom lens according to Example 4 of the present invention.

Figure 14:
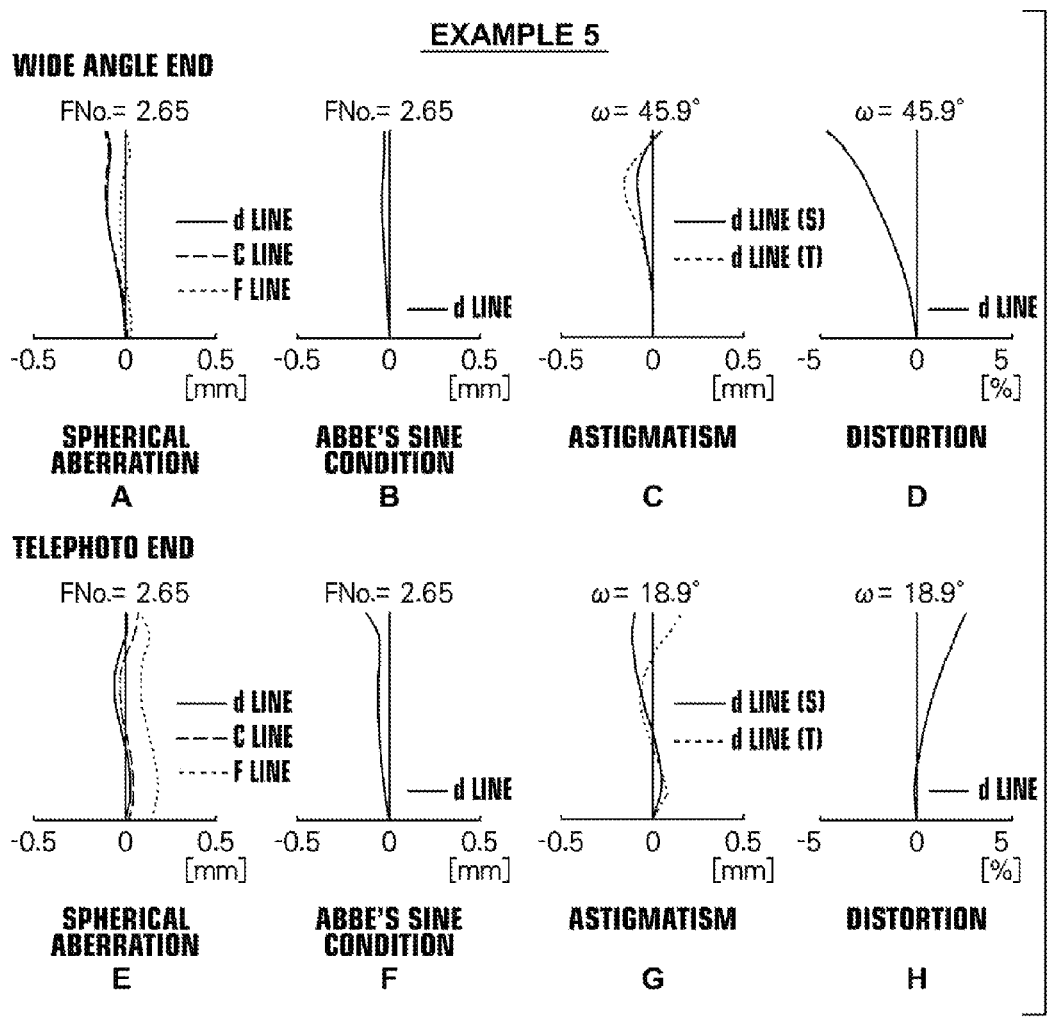

A through H of FIG. 14 are diagrams that illustrate various aberrations of the zoom lens according to Example 5 of the present invention.

Figure 15:
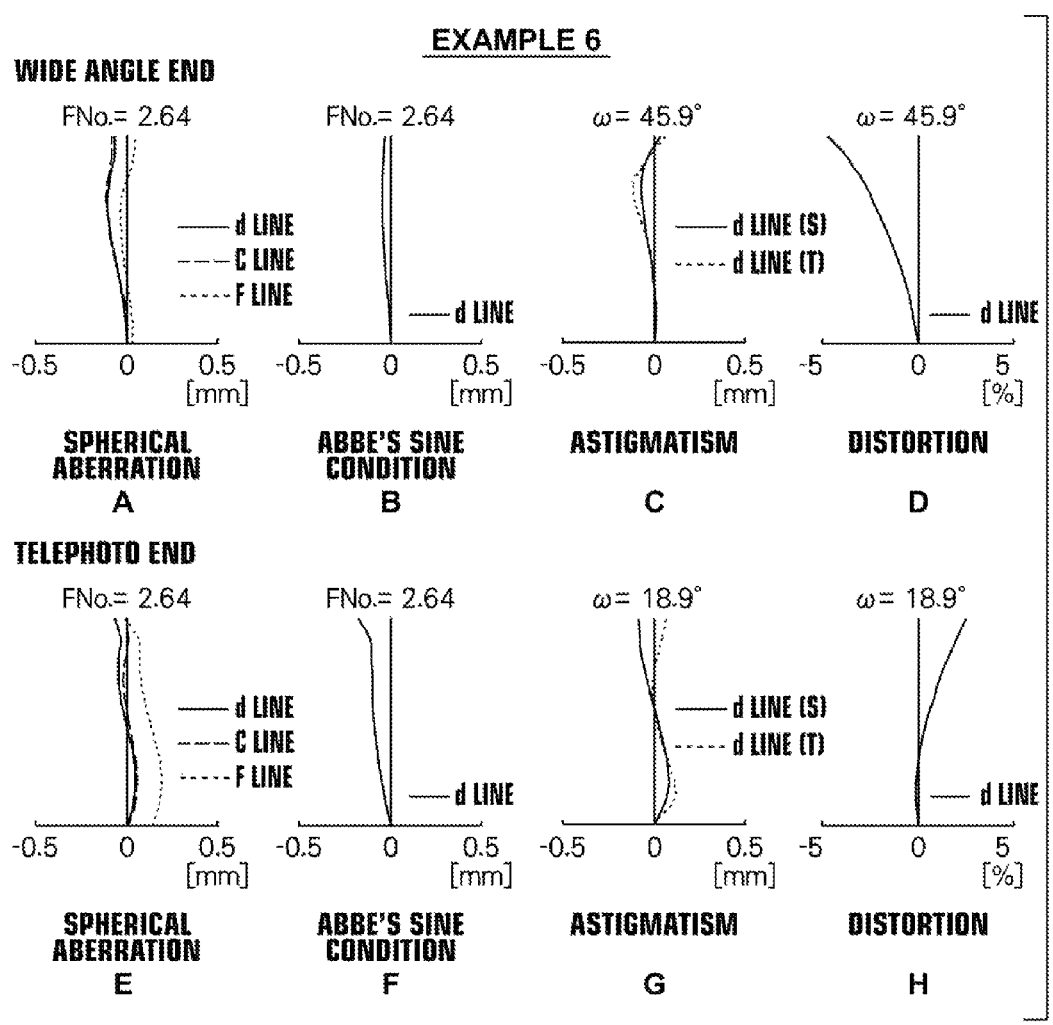

A through H of FIG. 15 are diagrams that illustrate various aberrations of the zoom lens according to Example 6 of the present invention.

Figure 16:
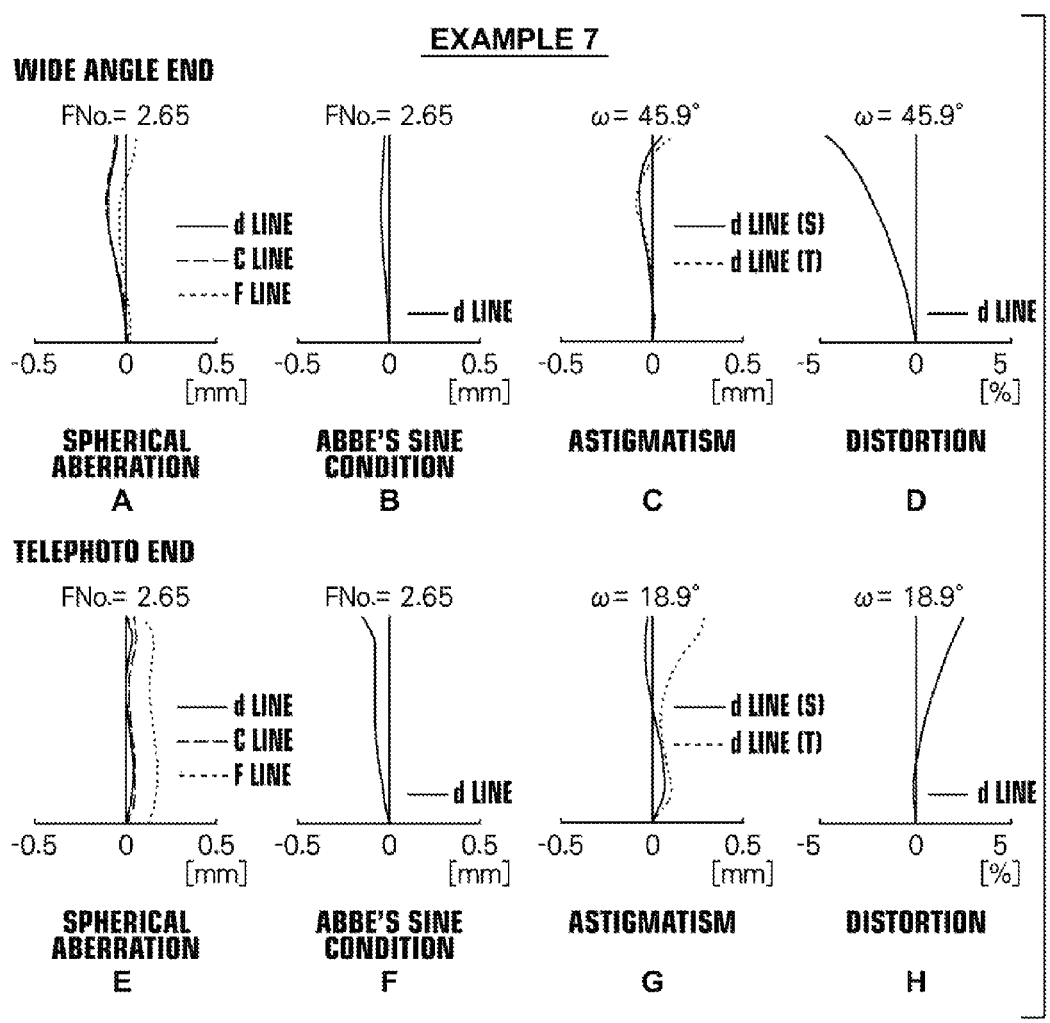

A through H of FIG. 16 are diagrams that illustrate various aberrations of the zoom lens according to Example 7 of the present invention.

Figure 17:
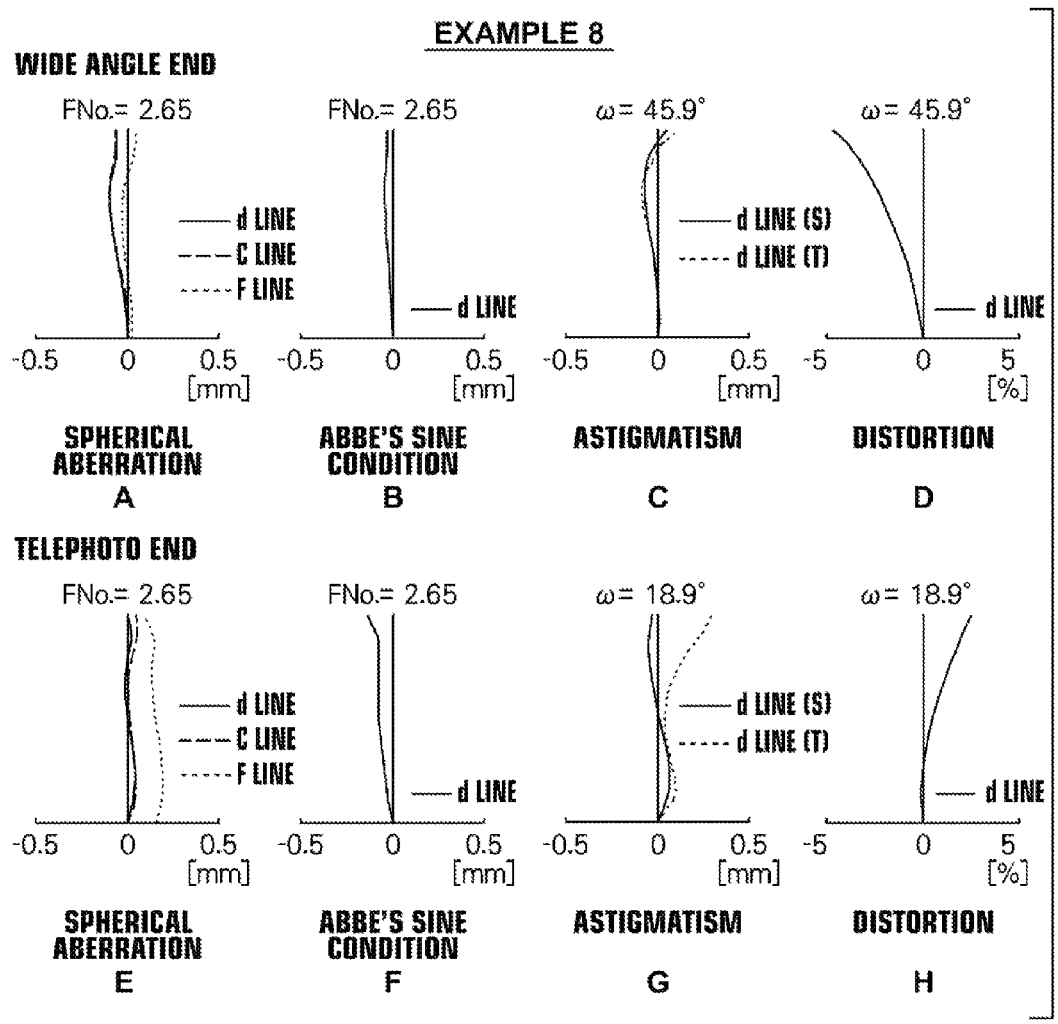

A through H of FIG. 17 are diagrams that illustrate various aberrations of the zoom lens according to Example 8 of the present invention.

Figure 18:
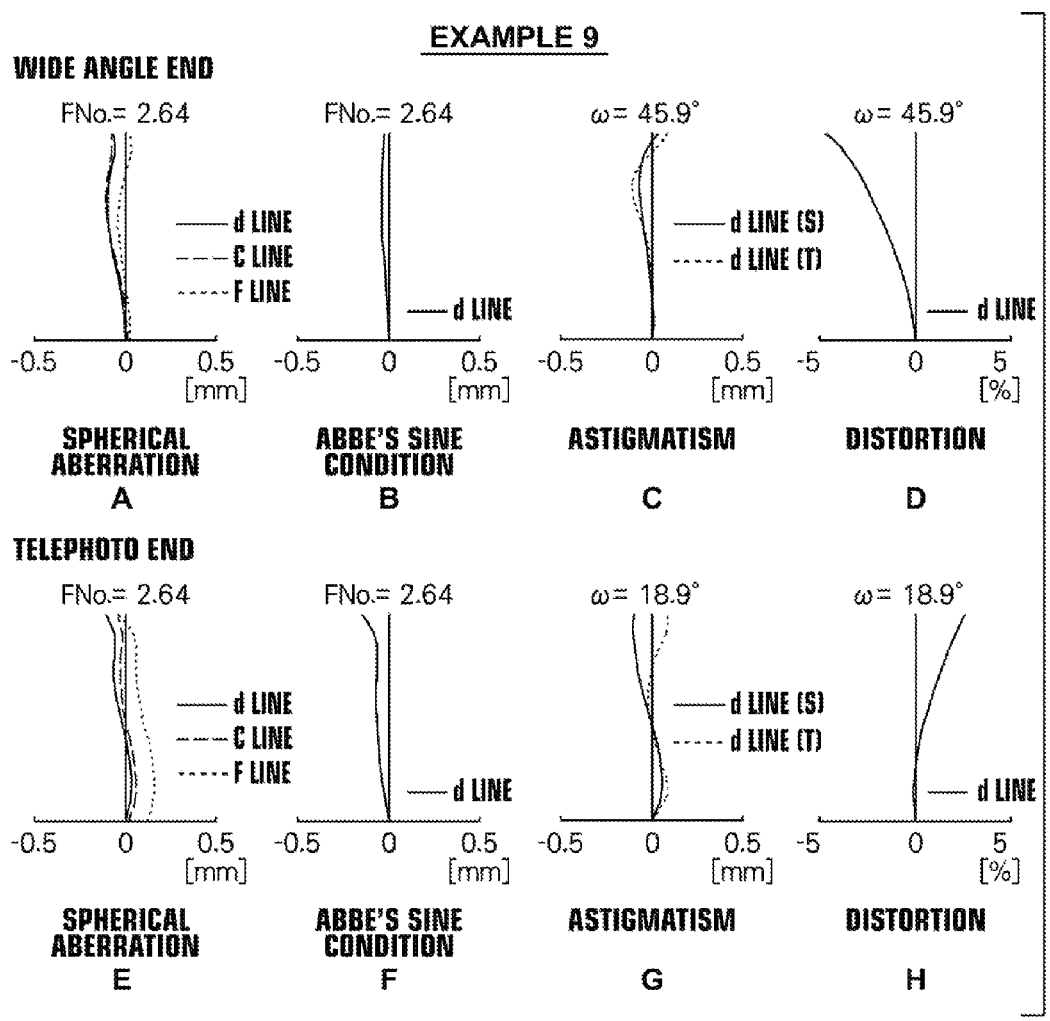

A through H of FIG. 18 are diagrams that illustrate various aberrations of the zoom lens according to Example 9 of the present invention.

Figure 19:
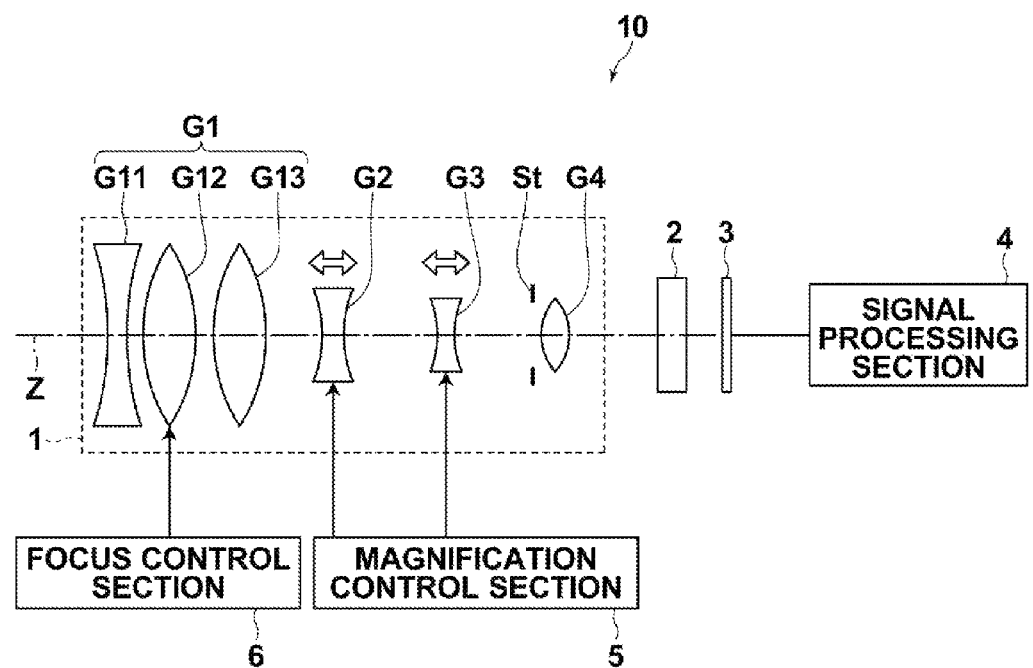

FIG. 19 is a diagram that illustrates the schematic configuration of an imaging apparatus according to an embodiment of the present invention.

BEST MODE FOR CARRYING OUT THE INVENTION

Figure 1:
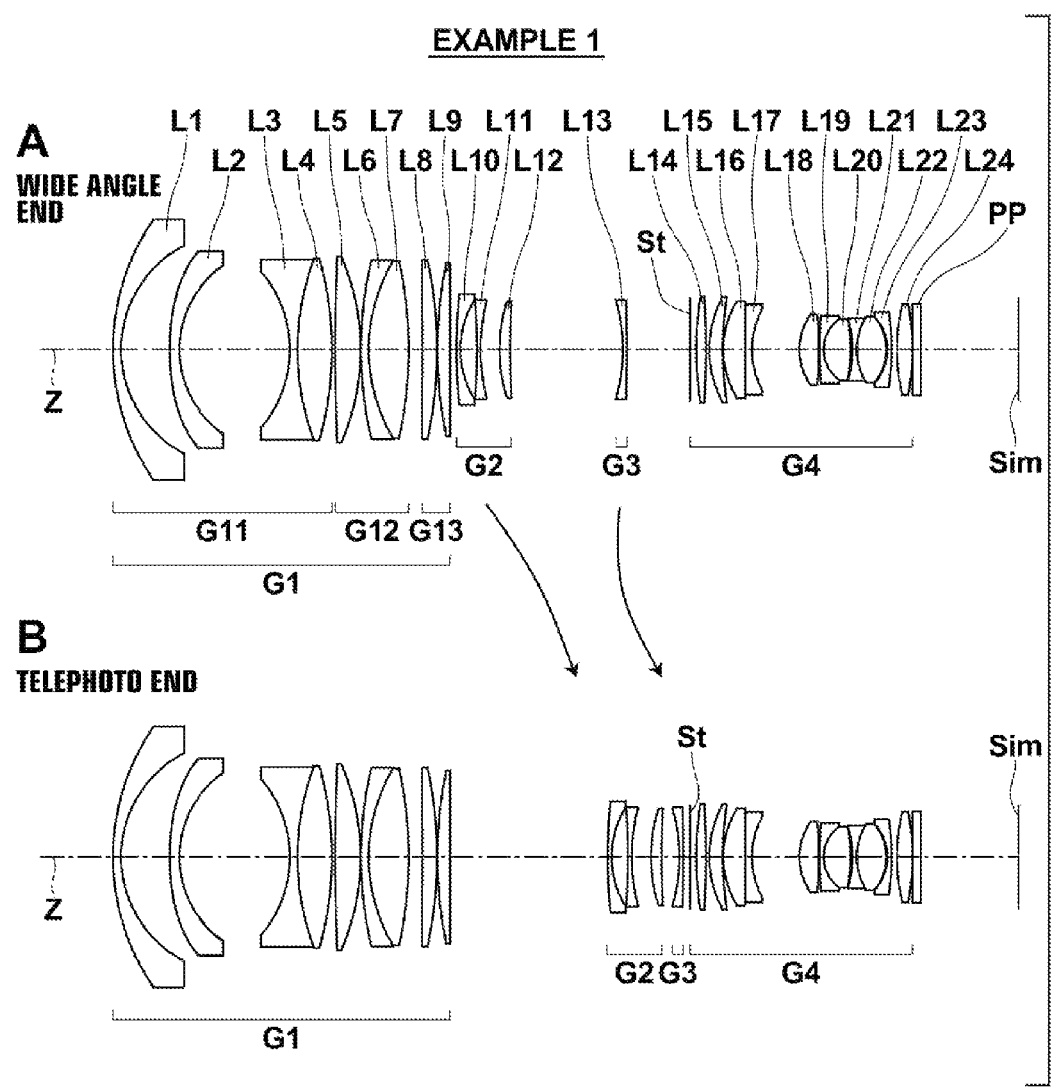
FIG. 1 is a collection of diagrams that illustrate the lens configuration of a zoom lens according to Example 1 of the present invention.

Hereinafter, embodiments of the present invention will be described in detail with reference to the attached drawings. FIG. 1 is a collection of cross sectional diagrams that illustrate the configuration of a zoom lens according to an embodiment of the present invention, and corresponds to a zoom lens of Example 1 to be described later. FIG. 2 through FIG. 9 are collections of cross sectional diagrams that illustrate configurations of zoom lenses according to other embodiments of the present invention, and correspond to zoom lenses of Examples 2 through 9 to be described later. The basic configurations of the embodiments illustrated in FIG. 1 through FIG. 9 are the same, and the manners in which the configurations are illustrated are also the same. Therefore, the zoom lenses according to the embodiments of the present invention will be described mainly with reference to FIG. 1.

In FIG. 1, the left side is the object side and the right side is the image side. A of FIG. 1 illustrates the arrangement of the optical system in a state focused on infinity at a wide angle end (shortest focal length state). B of FIG. 1 illustrates the arrangement of the optical system in a state focused on infinity at a telephoto end (longest focal length state). The same applies to FIGS. 2 through 9 to be described later.

The zoom lens of the present embodiment consists of: a first lens group G1 having a positive refractive power; a second lens group G2 having a negative refractive power; a third lens group having a negative refractive power; and a fourth lens group G4 having a positive refractive power, provided in this order from the object side.

The first lens group G1 consists of: a first lens subgroup G11 having a negative refractive power, which is fixed during focusing operations; a second lens subgroup G12 having a positive refractive power, which moves during focusing operations; and a third lens subgroup G13, which is fixed during focusing operations, provided in this order from the object side.

Note that the fourth lens group G4 includes an aperture stop St. The aperture stop St illustrated in FIG. 1 does not necessarily represent the size or shape thereof, but only the position thereof on an optical axis Z. In addition, Sim illustrated in FIG. 1 is an imaging surface, and an imaging device, such as a CCD (Charge Coupled Device) and a CMOS (Complementary Metal Oxide Semiconductor), is provided at the imaging surface, as will be described later.

Note that FIG. 1 illustrates an example in which a parallel plate optical member PP is provided between the fourth lens group G4 and the imaging surface Sim. When the zoom lens is applied to an imaging apparatus, a cover glass and various filters, such as an infrared ray cutoff filter and a low pass filter, are often provided between the optical system and the imaging surface Sim, according to the configuration of a camera on which the lens is to be mounted. The optical member PP is provided assuming the presence of the cover glass, the various types of filters, and the like. In addition, recent imaging apparatuses employ the 3 CCD format, in which CCD's are employed for each color in order to improve image quality. In order to be compatible with imaging apparatuses that employ the 3 CCD format, a color separating optical system such as a color separating prism may be inserted between the lens system and the imaging surface Sim. In this case, a color separating optical system may be provided at the position of the optical member PP.

In the zoom lens of the present embodiment, the second lens group G2 and the third lens group G3 move along the optical axis Z while changing magnification. More specifically, while changing magnification from the wide angle end to the telephoto end, the second lens group G2 moves toward the imaging surface Sim along a curved path to change magnification, and the third lens group G3 similarly moves toward the imaging surface Sim along a curved path, to correct movement of the imaging surface while changing magnification. Accordingly, the distance between the second lens group G2 and the first lens group gradually becomes greater, the distance between the third lens group G3 and the fourth lens group G4, changes, and the distance between the second lens group G2 and the third lens group G3 changes, while changing magnification from the wide angle end to the telephoto end. Meanwhile, the first lens group G1 and the fourth lens group G4 are fixed while changing magnification.

Note that FIG. 1 schematically illustrates the paths of movement of the second lens group G2 and the third lens group G3 while changing magnification from the wide angle end to the telephoto end with the arrows indicated in solid lines between A and B. However, the paths of movement of the lens groups are not limited to those illustrated in FIG. 1. The basic paths of movement of the second lens group G2 and the third lens group G3 of the present embodiment are common among Examples 1 through 9. Therefore, arrows indicating the paths of movement are omitted in FIGS. 2 through 9.

Hereinafter, the lenses that constitute each of the lens groups will be described. The first lens subgroup G11 is constituted by a first lens L1, a second lens L2, a third lens L3, and a fourth lens L4, provided in this order from the magnification side. For example, the first lens L1 is a negative meniscus lens having a concave surface toward the image side (that is, the side toward the imaging surface Sim at the right side of FIG. 1). The second lens L2 is similarly a negative meniscus lens having a concave surface toward the image side. The third lens L3 is a biconcave lens, and the fourth lens L4 is a biconvex lens. Note that in the example illustrated in FIG. 1, the third lens L3 and the fourth lens L4 are cemented together to form a cemented lens.

The second lens subgroup G12 is constituted by a fifth lens L5, a sixth lens L6, and a seventh lens L7, in this order from the object side. For example, the fifth lens L5 is a biconvex lens, the sixth lens L6 is a negative meniscus lens having a concave surface toward the image side, and the seventh lens L7 is a biconvex lens. Note that in the example illustrated in FIG. 1, a positive lens, that is, the fifth lens L5 having a positive refractive power, is provided such that the surface thereof having a radius of curvature with a smaller absolute value is toward the image side. The sixth lens L6 and the seventh lens L7 are cemented together to constitute a cemented lens. Note that the joint surface of the cemented lens has a convex surface toward the object side (the left side in FIG. 1).

The third lens subgroup G13 is constituted by an eighth lens L8 and a ninth lens L9, provided in this order from the object side. For example, the eighth lens L8 is a positive meniscus lens having a convex surface toward the image side, and the ninth lens L9 is a positive meniscus lens having a convex surface toward the object side.

Meanwhile, the second lens group G2 is constituted by a tenth lens L10, an eleventh lens L11, and a twelfth lens L12, provided in this order from the object side. For example, the tenth lens L10 is a negative meniscus lens having a concave surface toward the image side, the eleventh lens L11 is a biconcave lens, and the twelfth lens L12 is a positive meniscus lens having a convex surface toward the object side.

The third lens group G3 is constituted by a single thirteenth lens L13. The thirteenth lens L13 is a negative meniscus lens having a concave surface toward the object side, for example.

The fourth lens group G4 is constituted by the aperture stop St, a fourteenth lens L14, a fifteenth lens L15, a sixteenth lens L16, a seventeenth lens L17, an eighteenth lens L18, a nineteenth lens L19, a twentieth lens L20, a twenty first lens L21, a twenty second lens L22, a twenty third lens L23, and a twenty fourth lens L24, provided in this order from the object side. For example, the fourteenth lens L14 is a biconvex lens, the fifteenth lens L15 is a positive meniscus lens having a convex surface toward the object side, the sixteenth lens L16 is a positive meniscus lens having a convex surface toward the object side, the seventeenth lens L17 is a negative meniscus lens having a concave surface toward the image side, the eighteenth lens L18 is a biconvex lens, the nineteenth lens L19 is a negative meniscus lens having a concave surface toward the image side, the twentieth lens L20 is a biconvex lens, the twenty first lens L21 is a biconcave lens, the twenty second lens L22 is a biconvex lens, the twenty third lens L23 is a negative meniscus lens having a concave surface toward the object side, and the twenty fourth lens L24 is a biconvex lens. Note that the following lenses, that is, the sixteenth lens L16 and the seventeenth lens L17, the nineteenth lens L19 and the twenty lens L20, and the twenty first lens L21 and the twenty second lens L22, are respectively cemented to each other.

As described above, in the present zoom lens, the first lens group G1 substantially consists of: the first lens subgroup G11 having a negative refractive power which is fixed during focusing operations; the second lens subgroup G12 having a positive refractive power which moves during focusing operations; and the third lens subgroup G13 having the positive refractive power which is fixed during focusing operations, provided in this order from the magnification side. By adopting this configuration, variations in the angles of view during focusing operations can be suppressed, as described in Japanese Patent Publication No. 59(1984)-004686.

In addition, the second lens subgroup G12 substantially consists of: the fifth lens L5, which is a positive lens having a surface having a radius of curvature with a smaller absolute value toward the image side; and the cemented lens constituted by the sixth lens L6 and the seventh lens L7, provided in this order from the magnification side. The joint surface of the cemented lens has a convex surface toward the object side. Variations in aberrations due to focusing operations can be suppressed, by the second lens subgroup G12 having the configuration described above. Particularly, the advantageous effects of suppressing the amount of lateral chromatic aberrations and variations in astigmatism during focusing operations become more prominent, by orienting the joint surface in the manner described above.

Further, the present zoom lens satisfies the following conditional formula:

$$3.0 < f12/fw < 20.0 \quad (1)$$

wherein f12 is the focal length of the second lens subgroup G12, and fw is the focal length of the entire system at the wide angle end.

Further, the present zoom lens satisfies the following conditional formula to within the range defined by Conditional Formula (1).

$$4.0 < f12/fw < 10.0 \quad (1)'$$

Note that examples of the numerical values of the present embodiment will be described in a summarized manner with reference to Tables 1 through 28 later. For example, the value of the focal distance fw of the entire system at the wide angle end in the zoom lens of Example 1 is shown in the "Wide Angle End" column for Item f in Table 2. In addition, the value of the focal distance fw of the entire system at the wide angle end in the zoom lens of Example 2 is shown in the "Wide Angle End" column for Item f in Table 5, and the same applies to the other Examples. The values of "f12/fw" for each of the examples are shown in Table 28, as are the values corresponding to Conditional Formulae (2) through (6) to be described later.

The zoom lens of the present embodiment satisfies Conditional Formula (1), and therefore exhibits the following advantageous effects. That is, Conditional Formula (1) defines the ratio between the focal length of the entire system at the wide angle end and the focal length of the second lens subgroup G12. If the value of f12/fw is less than the lower limit defined in Conditional Formula (1), the refractive power of the second lens subgroup G12 will become excessively great, and the amount of variations in aberrations due to focusing operations will become great. Inversely, if the value of f12/fw is greater than the upper limit defined in Conditional Formula (1), a large amount of space will become necessary to perform focusing operations from an infinitely far distance to a close distance. In addition, the diameters of the lenses within the first lens subgroup G11 and the second lens subgroup G12 will increase, resulting in reductions in size and weight becoming difficult. The above shortcomings can be prevented in the case that Conditional Formula (1) is satisfied. If Conditional Formula (1) is satisfied, reductions in the size and weight of the zoom lens can be achieved, and variations in the amount of aberrations due to focusing operations can be suppressed.

The zoom lens of the present embodiment satisfies Conditional Formula (1)' within the range defined in Conditional Formula (1). Therefore, the above advantageous effects are exhibited more prominently.

In addition, the zoom lens of the present embodiment satisfies the following conditional formula:

$$-5.0 < f11/fw < -0.5 \qquad (2)$$

wherein f11 is the focal length of the first lens subgroup G11, and fw is the focal length of the entire system at the wide angle end.

Further, the zoom lens of the present embodiment satisfies the following conditional formula within the range defined by Conditional Formula (2) (refer to Table 28).

$$-3.0 < f11/fw < -1.2 \qquad (2)'$$

The zoom lens of the present embodiment satisfies Conditional Formula (2), and therefore exhibits the following advantageous effects. That is, Conditional Formula (2) defines the ratio between the focal distance of the entire system at the wide angle end and the focal distance of the first lens subgroup G11. If the value of f11/fw is less than the lower limit defined in Conditional Formula (2), a large amount of space will become necessary to perform focusing operations from an infinitely far distance to a close distance. In addition, the diameters of the lenses that constitute the first lens subgroup G11 and the second lens subgroup G12 will increase, and it will become difficult to reduce the size and weight of the zoom lens. Inversely, if the value of f11/fw is greater than the upper limit defined in Conditional Formula (2), the refractive power of the first lens subgroup G11 will become excessively great, resulting in increases in the amount of distortion at the wide angle end and the amount of spherical aberration at the telephoto end. The above shortcomings can be prevented in the case that Conditional Formula (2) is satisfied. If Conditional Formula (2) is satisfied, reductions in the size and the weight of the zoom lens can be achieved, while the amount of distortion at the wide angle end and the amount of spherical aberration at the telephoto end can be suppressed.

The zoom lens of the present embodiment satisfies Conditional Formula (2)' within the range defined in Conditional Formula (2). Therefore, the above advantageous effects are exhibited more prominently.

Further, in the zoom lens of the present invention, the first lens subgroup G11 is constituted by: the negative meniscus lens (the first lens L1) having a concave surface toward the image side; the negative meniscus lens (the second lens L2) similarly having a concave surface toward the image side; and the cemented lens constituted by the biconcave lens (the third lens L3) toward the object side and the biconvex lens (the fourth lens L4) toward the image side, which are cemented together, provided in this order from the object side. By adopting this basic configuration, it becomes possible to for the first lens subgroup to be miniaturized, and also for high order spherical aberrations to be suppressed at the telephoto end.

In addition, the first lens subgroup G11 of the zoom lens according to the present embodiment has the basic configuration described above, and satisfies the following conditional formula:

$$0.60 < D4/f1 < 2.0 \qquad (3)$$

wherein D4 is the distance between the surfaces of the second negative meniscus lens (the second lens L2) and the cemented lens (the cemented lens constituted by the lens L3 and the lens L4), and f1 is the focal length of the first lens group G1. Note that the above distance between surfaces is a spatial distance along the optical axis. Further, the following conditional formula is satisfied within the range defined by Conditional Formula (3) (refer to Table 28).

$$0.70 < D4/f1 < 1.0 \qquad (3)'$$

The zoom lens of the present embodiment satisfies Conditional Formula (3), and therefore exhibits the following advantageous effect. That is, Conditional Formula (3) defines the ratio between the focal distance of the first lens group G1 and the distance between the aforementioned surfaces (the distance between the surfaces of the second negative meniscus lens from the object side and the cemented lens). If the value of D4/f1 is less than the lower limit defined in Conditional Formula (3), field curvature will tend to be present toward the lower side of images. If such field curvature is corrected by other lens groups, high order field curvature will be generated, which is difficult to correct. Inversely, if the value of D4/f1 is greater than the upper limit defined in Conditional Formula (3), field curvature will tend to be present toward the upper side of images. If such field curvature is corrected by other lens groups, high order field curvature will be generated, which is difficult to correct. The above shortcomings can be prevented if Conditional Formula (3) is satisfied, and it will be possible to favorably correct field curvature.

The present zoom lens satisfies Conditional Formula (3)' within the range defined in Conditional Formula (3). Therefore, the advantageous effect described above is more prominently exhibited.

In addition, the first lens subgroup G11 of the zoom lens according to the present embodiment has the basic configuration described above, and satisfies the following conditional formula:

$$-1.0 < (R5-R7)/(R5+R7) < -0.1 \qquad (4)$$

wherein R5 is the radius of curvature of the surface of the cemented lens constituted by the lenses L3 and L4 within the first lens subgroup G11 toward the object side, and R7 is the radius of curvature of the surface of the cemented lens toward the image side.

Further, the zoom lens of the present embodiment satisfies the following conditional formula within the range defined by Conditional Formula (4) (refer to Table 28).

$$-0.8 < (R5-R7)/(R5+R7) < -0.25 \qquad (4)'$$

The zoom lens of the present embodiment satisfies Conditional Formula (4) described above, and therefore the following advantageous effects are exhibited. That is, Conditional Formula (4) defines the relationship between the radius of curvature of the surface toward the object side and the surface toward the image side of the cemented lens within the first lens subgroup. If the value of (R5−R7)/(R5+R7) is less than the lower limit defined in Conditional Formula (4), field curvature will tend to be present toward the lower side of images, which is difficult to correct. Inversely, if the value of (R5−R7)/(R5+R7) is greater than the upper limit defined in Conditional Formula (4), high order field curvature will be generated, which is difficult to correct. The above shortcomings can be prevented if Conditional Formula (4) is satisfied, and it will be possible to favorably correct field curvature.

The zoom lens of the present embodiment satisfies Conditional Formula (4)' within the range defined in Conditional Formula (4). Therefore, the advantageous effect described above is more prominently exhibited.

In addition, the first lens subgroup G11 of the zoom lens according to the present embodiment has the basic configuration described above, and satisfies the following conditional formula:

$$20.0<\nu d2<35.0 \quad (5)$$

wherein υd2 is the Abbe's number of the second negative meniscus lens from the object side within the first lens subgroup G11, that is, the second lens L2, with respect to the d line.

Further, the zoom lens of the present embodiment satisfies the following conditional formula to be satisfied within the range defined in Conditional Formula (5) (refer to Table 28).

$$22.0<\nu d2<32.0 \quad (5)'$$

The zoom lens of the present embodiment satisfies Conditional Formula (5), and therefore the following advantageous effects are exhibited. That is, if the value of υd2 is less than the lower limit defined in Conditional Formula (5), the amount of lateral chromatic aberration at the wide angle end becomes great. Inversely, if the value of υd2 is greater than the upper limit defined in Conditional Formula (5), the specific weight of the second lens L2 will become great, and the weight of the zoom lens will increase. The above shortcomings can be prevented in the case that Conditional Formula (5) is satisfied, lateral chromatic aberration can be suppressed at the wide angle end, and weight reduction of the zoom lens can also be realized. The second lens L2 is a lens having a particularly large diameter within the entire system. Therefore, employing a glass material having a low specific weight is extremely advantageous from the viewpoint of weight reduction of the zoom lens.

The zoom lens of the present embodiment satisfies Conditional Formula (5)' within the range defined in Conditional Formula (5). Therefore, the above advantageous effects are more prominently exhibited.

In addition, the first lens subgroup G11 of the zoom lens according to the present embodiment has the basic configuration described above, and satisfies the following conditional formula:

$$35.0<\nu d4<100.0 \quad (6)$$

wherein υd4 is the Abbe's number of the biconvex lens that constitutes the cemented lens within the first lens subgroup G11, that is, the fourth lens L4, with respect to the d line.

Further, the zoom lens of the present embodiment satisfies the following conditional formula within the range defined in Conditional Formula (6).

$$40.0<\nu d4<72.0 \quad (6)'$$

Still further, the zoom lens of the present embodiment satisfies the following conditional formula (refer to Table 28).

$$40.0<\nu d4<60.0 \quad (6)''$$

The zoom lens of the present embodiment satisfies Conditional Formula (6), and therefore the following advantageous effects are exhibited. That is, if the value of υd4 is less than the lower limit defined in Conditional Formula (6), the amount of lateral chromatic aberration will increase. If this lateral chromatic aberration is to be corrected by the other lens groups, the Abbe's numbers of the other lenses, for example, the Abbe's number υd2 of the second lens L2, will increase, which will result in glass materials having high specific weights being used, leading to an increase in the weight increase of the zoom lens. Inversely, if the value of υd4 is greater than the upper limit defined in Conditional Formula (6), the amount of lateral chromatic aberration will increase, and correction thereof will become difficult. The above shortcomings can be prevented if Conditional Formula (6) is satisfied, and weight reduction of the zoom lens can be realized while suppressing the amount of lateral chromatic aberration.

The zoom lens of the present embodiment satisfies Conditional Formula (6)' and further satisfies Conditional Formula (6)'', within the range defined in Conditional Formula (6). Therefore, the above advantageous effects are more prominently exhibited.

Next, examples of numerical values of the embodiments of the zoom lens of the present invention will be described in particular detail.

Example 1

As described previously, the arrangements of the zoom lens of Example 1 at the wide angle end and at the telephoto end are illustrated in FIG. 1. Note that detailed descriptions of the lens groups and each lens in the configuration of FIG. 1 have already been given, and therefore redundant descriptions will be omitted below unless particularly necessary.

Table 1 shows basic lens data of the zoom lens of Example 1. Table 1 also shows data regarding the optical member PP. In Table 1, ith (i=1, 2, 3, . . . ) lens surface numbers that sequentially increase from the object side to the image side, with the lens surface at the most object side designated as first, are shown in the column Si. The radii of curvature of ith surfaces are shown in the column Ri, and the distances between an ith surface and an i+1st surface along the optical axis Z are shown in the column Di. The refractive indices of jth (j=1, 2, 3, . . . ) optical elements from the object side to the image side with respect to the d line (wavelength: 587.6 nm), j being a number that increases sequentially with the optical element most toward the object side designated as first, are shown in the column Ndj. The Abbe's numbers of the jth optical element with respect to the d line are shown in the column υdj. Note that the aperture stop St is also included in the basic lens data, and the radius of curvature of the surface corresponding to the aperture stop St is shown as "∞" (aperture stop).

The units of the radii of curvature R and the distances D between adjacent lens surfaces are mm. Table 1 shows numerical values which are rounded to a predetermined number of digits. The signs of the radii of curvature are positive in cases that the surface shape is convex toward the object side, and negative in cases that the surface shape is convex toward the image side.

Among the distances D between adjacent lens surfaces, the distance between the first lens group G1 and the second lens group G2, the distance between the second lens group G2 and the third lens group G3, and the distance between the third lens group G3 and the fourth lens group G4 are variable distances that change while changing magnification. "Variable Distance 16", "Variable Distance 22", and "Variable Distance 24" are shown in the columns corresponding to these distances, by adding the surface number of the front side surface.

In the lens data of Table 1, surface numbers of aspherical surfaces are denoted with the mark "*", and numerical values that represent paraxial radii of curvature are shown as the radii of curvature of the aspherical surfaces.

The foregoing applies to Tables 4, 7, 10, 13, 16, 19, 22, and 25 to be described later.

Table 2 shows the focal length f of the entire system at the wide angle end and at the telephoto end when the zoom lens of Example 1 changes magnification, and the values of the aforementioned Variable Distance 16, Variable Distance 22, and Variable Distance 24. Table 2 also shows values of the back focus BF, the F number F No., and the full angle of view 2ω of the zoom lens of Example 1. The unit of measurement of lengths is also mm in Table 2, and the unit of measurement of the full angle of view 2ω is degrees (°). Table 2 shows numerical values which are rounded off at a predetermined number of digits as well. As shown in Table 2, the zoom lens of the present example has a full angle of view of 91.82° at the wide angle end, which is a sufficiently wide angle of view.

The manner in which items are shown in Table 2 described above also apply to Tables 5, 8, 11, 14, 17, 20, 23, and 26 to be described later. Note that the zoom lenses of Examples 2 through 9 have full angles of view within a range from 91.80° to 91.84° at the wide angle end, which are sufficiently wide angles of view.

Table 3 shows aspherical surface data of the zoom lens of Example 1. Table 3 shows the surface numbers of aspherical surfaces and the aspherical surface coefficients related to each of the aspherical surfaces. In the numerical values of the aspherical surface coefficients of Table 3, "E-n (n: integer)" means "·10$^{-n}$". Note that the aspherical surface coefficients are the values of the coefficients KA and Am (m=3, 4, 5, . . . , 20) in the aspherical surface formula below:

$$Zd = C \cdot h^2 / \{1 + (1 - KA \cdot C^2 \cdot h^2)^{1/2}\} + \Sigma Am \cdot h^m$$

wherein: Zd is the depth of the aspherical surface (the length of a normal line that extends from a point on the aspherical surface having a height h to a plane perpendicular to the optical axis that contacts the peak of the aspherical surface), h is the height (the distance from the optical axis to the surface of the lens), C is the inverse of the paraxial radius of curvature, and KA and Am are aspherical surface coefficients (m=3, 4, 5, . . . , 20).

The manner in which items are shown in Table 3 described above also apply to Tables 6, 9, 12, 15, 18, 21, 24, and 27 to be described later.

In all of the tables below, mm is used as the units for lengths and degrees (°) are used as units of angles. However, it is possible for optical systems to be proportionately enlarged or proportionately reduced and utilized. Therefore, other appropriate units may be used.

TABLE 1

Example 1: Basic Lens Data

| Si (Surface Number) | Ri (Radius of Curvature) | Di (Distance) | ndj (Refractive Index) | vdj (Abbe's Number) |
|---|---|---|---|---|
| 1 | 70.6894 | 2.500 | 1.77250 | 49.60 |
| 2 | 36.2044 | 14.942 | | |
| *3 | 78.3014 | 3.000 | 1.71736 | 29.52 |
| 4 | 31.8282 | 33.886 | | |
| 5 | −37.1642 | 2.351 | 1.51742 | 52.43 |
| 6 | 79.1217 | 10.569 | 1.69680 | 55.53 |
| 7 | −103.2282 | 1.007 | | |
| 8 | 710.7794 | 7.791 | 1.49700 | 81.54 |
| 9 | −72.7024 | 0.153 | | |
| 10 | 119.9323 | 2.350 | 1.88300 | 40.76 |
| 11 | 53.1778 | 12.286 | 1.49700 | 81.54 |
| 12 | −125.7910 | 4.180 | | |
| 13 | −11562.9370 | 4.509 | 1.49700 | 81.54 |
| 14 | −132.5599 | 0.150 | | |

TABLE 1-continued

Example 1: Basic Lens Data

| Si (Surface Number) | Ri (Radius of Curvature) | Di (Distance) | ndj (Refractive Index) | vdj (Abbe's Number) |
|---|---|---|---|---|
| 15 | 132.0399 | 3.837 | 1.72916 | 54.68 |
| 16 | 214748.3648 | Variable Distance 16 | | |
| 17 | 176.3697 | 1.200 | 1.72916 | 54.68 |
| 18 | 29.1778 | 5.022 | | |
| 19 | −217.7742 | 1.200 | 1.56907 | 71.30 |
| 20 | 60.7196 | 5.862 | | |
| 21 | 48.4550 | 3.309 | 1.71736 | 29.52 |
| 22 | 351.0532 | Variable Distance 22 | | |
| 23 | −53.3473 | 1.200 | 1.49700 | 81.54 |
| 24 | −430.3779 | Variable Distance 24 | | |
| 25 | ∞ (Aperture Stop) | 2.000 | | |
| 26 | 106.4359 | 2.947 | 1.81600 | 46.62 |
| 27 | −275.7217 | 1.001 | | |
| 28 | 34.0947 | 4.163 | 1.84139 | 24.56 |
| 29 | 106.1829 | 0.156 | | |
| 30 | 28.5710 | 6.768 | 1.43875 | 94.93 |
| 31 | 172434.0964 | 2.000 | 1.88300 | 40.76 |
| 32 | 25.5769 | 14.617 | | |
| 33 | 18.8629 | 5.981 | 1.49700 | 81.54 |
| 34 | −105.5462 | 0.250 | | |
| 35 | 147.7496 | 1.202 | 1.84661 | 23.78 |
| 36 | 11.6822 | 8.200 | 1.65160 | 58.55 |
| 37 | −57.4503 | 0.602 | | |
| 38 | −33.8318 | 1.370 | 1.88300 | 40.76 |
| 39 | 19.0289 | 9.049 | 1.54814 | 45.79 |
| 40 | −16.0911 | 0.365 | | |
| 41 | −15.0638 | 1.248 | 1.83481 | 42.71 |
| 42 | −80.2654 | 1.644 | | |
| 43 | 57.4547 | 4.779 | 1.84661 | 23.78 |
| 44 | −73.5517 | 0.000 | | |
| 45 | ∞ | 2.490 | 1.51632 | 64.00 |
| 46 | ∞ | 30.151 | | |

*Aspherical Surface

TABLE 2

Example 1: Data Related to Zoom

| Item (d line) | Wide Angle End | Telephoto End |
|---|---|---|
| Zoom Ratio | 1.0 | 2.8 |
| f | 16.00 | 44.80 |
| Bf | 31.79 | 31.79 |
| FNo. | 2.65 | 2.65 |
| 2ω[°] | 91.82 | 37.85 |
| Variable Distance 16 | 2.000 | 48.516 |
| Variable Distance 22 | 34.613 | 5.453 |
| Variable Distance 24 | 19.357 | 2.002 |

TABLE 3

Example 1: Aspherical Surface Coefficients

| Surface Number | 3 |
|---|---|
| KA | 1.000000E+00 |
| A3 | −8.207591E−06 |
| A4 | 3.612926E−06 |
| A5 | −9.721934E−08 |
| A6 | 3.980679E−09 |
| A7 | −2.732476E−11 |
| A8 | −6.666219E−13 |
| A9 | 2.921671E−15 |
| A10 | 2.334960E−16 |
| A11 | 4.493755E−18 |
| A12 | 6.893503E−20 |

TABLE 3-continued

Example 1: Aspherical Surface Coefficients

| Surface Number | 3 |
|---|---|
| A13 | 9.185959E−22 |
| A14 | 1.129241E−23 |
| A15 | 1.316193E−25 |
| A16 | 1.470968E−27 |
| A17 | 1.574483E−29 |
| A18 | 1.586896E−31 |
| A19 | 1.429637E−33 |
| A20 | 9.519133E−36 |

Table 28 shows the values of Examples 1 through 9 corresponding to Conditional Formulae (1) through (6), that is, the variable portions of the conditional formulae. The values shown in Table 28 are related to the d line. As shown in Table 28, the zoom lens of Example 1 and the zoom lenses of Examples 2 through 9 to be described later satisfy all of Conditional Formulae (1) through (6), and further satisfy Conditional Formulae (1)' through (6)' as well as (6)" that define more preferable ranges within Conditional Formulae (1) through (6). The advantageous effects obtained by satisfying these conditional formulae are those which were previously described in detail.

The spherical aberration, the Abbe's sine condition, the astigmatic aberration, and the distortion of the zoom lens of Example 1 when focused on infinity at the wide angle end are illustrated in A through D of FIG. 10, respectively. The spherical aberration, the Abbe's sine condition, the astigmatic aberration, and the distortion of the zoom lens of Example 1 when focused on infinity at the telephoto end are illustrated in E through H of FIG. 10, respectively. Each of the diagrams that illustrate the aberrations use the d line (wavelength: 587.6 nm) as a standard. However, aberrations related to the C line (wavelength: 656.3 nm) and the F line (wavelength: 486.1 nm) are also shown in the diagrams that illustrate spherical aberration. In the diagrams that illustrate astigmatic aberrations, aberrations in the sagittal direction are indicated by solid lines denoted with the letter (S), while aberrations in the tangential direction are indicated by broken lines denoted by the letter (T). In the diagrams that illustrate spherical aberrations and Abbe's sine conditions, "Fno." denotes F values. In the other diagrams that illustrate the aberrations, ω denotes half angles of view.

The manner in which the aberrations are illustrated described above also apply to FIG. 11 through FIG. 18 to be referred to later.

Example 2

Figure 2:
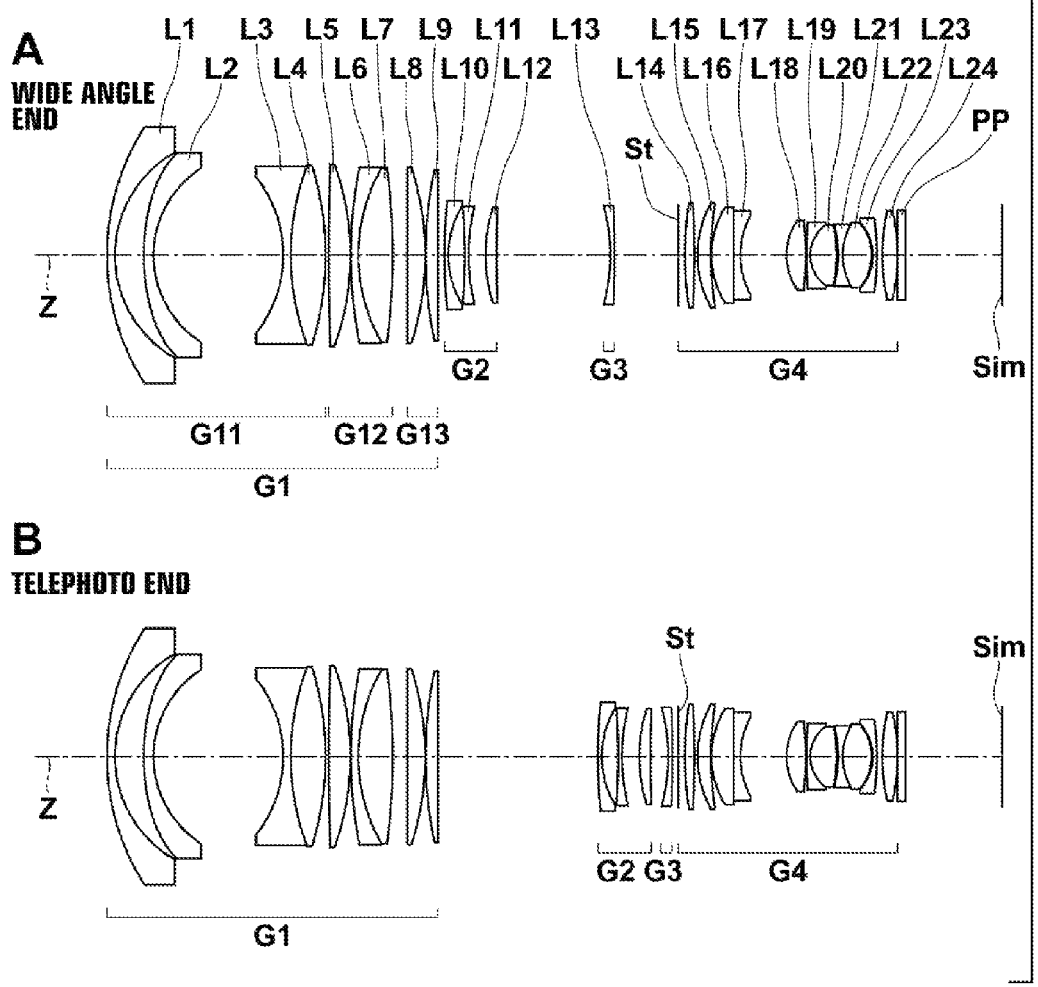
FIG. 2 is a collection of diagrams that illustrate the lens configuration of a zoom lens according to Example 2 of the present invention.

FIG. 2 illustrates the arrangements of lens groups of a zoom lens according to Example 2 at the wide angle end and at the telephoto end. The zoom lens of Example 2 has approximately the same configuration as that of the zoom lens according to Example 1 described above. However, the zoom lens of Example 2 differs from the zoom lens of Example 1 in four points, that an eighth lens L8 of a third lens subgroup G13 is a planoconvex lens having a convex surface toward the image side, that a ninth lens L9 of the third lens subgroup G13 is a planoconvex lens having a convex surface toward the object side, that a sixteenth lens L16 of a fourth lens group G4 is a planoconvex lens having a convex surface toward the object side, and that a seventeenth lens L17 of the fourth lens group G4 is a planoconcave lens having a concave surface toward the image side.

Note that the zoom lenses of Example 2 through 9 differ from the zoom lens of Example 1 in the same four points. Therefore, the above description will not be repeated in the descriptions of Examples 2 through 9.

Table 4 shows basic lens data of the zoom lens of Example 2. Table 5 shows data related to zoom of the zoom lens of Example 2. Table 6 shows aspherical surface data of the zoom lens of Example 2. A through H of FIG. 11 are diagrams that illustrate various aberrations of the zoom lens of Example 2.

TABLE 4

Example 2: Basic Lens Data

| Si (Surface Number) | Ri (Radius of Curvature) | Di (Distance) | ndj (Refractive Index) | vdj (Abbe's Number) |
|---|---|---|---|---|
| 1 | 74.3554 | 2.500 | 1.77250 | 49.60 |
| 2 | 37.0736 | 9.050 | | |
| *3 | 74.6705 | 3.000 | 1.71736 | 29.52 |
| 4 | 32.4015 | 40.474 | | |
| 5 | −39.3056 | 2.351 | 1.51742 | 52.43 |
| 6 | 79.4984 | 10.832 | 1.68976 | 55.87 |
| 7 | −95.0396 | 1.000 | | |
| 8 | 942.4408 | 6.741 | 1.49700 | 81.54 |
| 9 | −84.1340 | 0.153 | | |
| 10 | 143.5405 | 2.350 | 1.88300 | 40.76 |
| 11 | 54.9687 | 10.715 | 1.49700 | 81.54 |
| 12 | −208.1561 | 4.636 | | |
| 13 | ∞ | 5.479 | 1.49700 | 81.54 |
| 14 | −90.5871 | 0.150 | | |
| 15 | 130.9116 | 3.895 | 1.72735 | 54.79 |
| 16 | ∞ | Variable Distance 16 | | |
| 17 | 175.4952 | 1.200 | 1.72604 | 54.86 |
| 18 | 29.5678 | 5.094 | | |
| 19 | −188.4508 | 1.200 | 1.57071 | 61.97 |
| 20 | 62.4076 | 5.379 | | |
| 21 | 48.8963 | 3.485 | 1.73296 | 28.72 |
| 22 | 389.6690 | Variable Distance 22 | | |
| 23 | −57.8876 | 1.200 | 1.49700 | 81.54 |
| 24 | −674.9530 | Variable Distance 24 | | |
| 25 | ∞ (Aperture Stop) | 2.000 | | |
| 26 | 106.0772 | 2.946 | 1.81600 | 46.62 |
| 27 | −289.6274 | 1.001 | | |
| 28 | 34.3478 | 4.199 | 1.84139 | 24.56 |
| 29 | 102.9588 | 0.156 | | |
| 30 | 28.5956 | 7.020 | 1.43875 | 94.93 |
| 31 | ∞ | 2.000 | 1.88300 | 40.76 |
| 32 | 25.7137 | 14.356 | | |
| 33 | 18.8684 | 6.008 | 1.49700 | 81.54 |
| 34 | −102.4860 | 0.250 | | |
| 35 | 152.1469 | 1.202 | 1.84661 | 23.78 |
| 36 | 11.7487 | 8.124 | 1.65160 | 58.55 |
| 37 | −57.7285 | 0.607 | | |
| 38 | −33.8090 | 1.373 | 1.88300 | 40.76 |
| 39 | 19.2141 | 8.993 | 1.54814 | 45.79 |
| 40 | −16.1301 | 0.405 | | |
| 41 | −14.9925 | 1.248 | 1.83481 | 42.71 |
| 42 | −85.8896 | 1.744 | | |
| 43 | 63.9904 | 4.694 | 1.84661 | 23.78 |
| 44 | −62.5397 | 0.000 | | |
| 45 | ∞ | 2.490 | 1.51632 | 64.00 |
| 46 | ∞ | 30.164 | | |

*Aspherical Surface

TABLE 5

Example 2: Data Related to Zoom

| Item (d line) | Wide Angle End | Telephoto End |
|---|---|---|
| Zoom Ratio | 1.0 | 2.8 |
| f' | 16.00 | 44.81 |
| Bf | 31.81 | 31.81 |
| FNo. | 2.64 | 2.64 |
| 2ω[°] | 91.80 | 37.83 |
| Variable Distance 16 | 2.000 | 49.972 |
| Variable Distance 22 | 35.468 | 5.587 |
| Variable Distance 24 | 20.060 | 1.969 |

TABLE 6

Example 2: Aspherical Surface Coefficients

| Surface Number | 3 |
|---|---|
| KA | 1.000000E+00 |
| A3 | −9.549332E−06 |
| A4 | 3.435302E−06 |
| A5 | −1.009670E−07 |
| A6 | 3.938844E−09 |
| A7 | −2.766388E−11 |
| A8 | −6.688923E−13 |
| A9 | 2.909841E−15 |
| A10 | 2.334913E−16 |
| A11 | 4.495057E−18 |
| A12 | 6.896460E−20 |
| A13 | 9.190880E−22 |
| A14 | 1.129956E−23 |
| A15 | 1.317149E−25 |
| A16 | 1.472178E−27 |
| A17 | 1.575950E−29 |
| A18 | 1.588620E−31 |
| A19 | 1.431612E−33 |
| A20 | 9.541324E−36 |

Example 3

FIG. 3 illustrates the arrangements of lens groups of a zoom lens according to Example 3 at the wide angle end and at the telephoto end.

Table 7 shows basic lens data of the zoom lens of Example 3. Table 8 shows data related to zoom of the zoom lens of Example 3. Table 9 shows aspherical surface data of the zoom lens of Example 3. A through H of FIG. 12 are diagrams that illustrate various aberrations of the zoom lens of Example 3.

TABLE 7

Example 3: Basic Lens Data

| Si (Surface Number) | Ri (Radius of Curvature) | Di (Distance) | ndj (Refractive Index) | vdj (Abbe's Number) |
|---|---|---|---|---|
| 1 | 72.2277 | 2.500 | 1.77250 | 49.60 |
| 2 | 36.0856 | 14.893 | | |
| *3 | 80.4940 | 3.000 | 1.71736 | 29.52 |
| 4 | 32.6052 | 34.044 | | |
| 5 | −37.4714 | 2.351 | 1.51742 | 52.43 |
| 6 | 75.6770 | 12.586 | 1.65858 | 57.45 |
| 7 | −72.7386 | 1.000 | | |
| 8 | 773.9693 | 6.164 | 1.49700 | 81.54 |
| 9 | −98.1399 | 0.153 | | |
| 10 | 123.0122 | 2.350 | 1.88300 | 40.76 |
| 11 | 55.0010 | 10.398 | 1.49700 | 81.54 |
| 12 | −275.3506 | 4.967 | | |
| 13 | ∞ | 5.551 | 1.49700 | 81.54 |
| 14 | −89.8665 | 0.150 | | |
| 15 | 139.9896 | 3.845 | 1.70856 | 55.73 |

TABLE 7-continued

Example 3: Basic Lens Data

| Si (Surface Number) | Ri (Radius of Curvature) | Di (Distance) | ndj (Refractive Index) | vdj (Abbe's Number) |
|---|---|---|---|---|
| 16 | ∞ | Variable Distance 16 | | |
| 17 | 162.7064 | 1.200 | 1.73953 | 53.71 |
| 18 | 29.3009 | 5.205 | | |
| 19 | −228.9447 | 1.200 | 1.57378 | 56.13 |
| 20 | 64.0582 | 5.055 | | |
| 21 | 47.8155 | 3.362 | 1.75181 | 27.76 |
| 22 | 299.6376 | Variable Distance 22 | | |
| 23 | −53.8761 | 1.200 | 1.49700 | 81.54 |
| 24 | −599.1561 | Variable Distance 24 | | |
| 25 | ∞ (Aperture Stop) | 2.000 | | |
| 26 | 106.3867 | 2.949 | 1.81600 | 46.62 |
| 27 | −289.6165 | 1.001 | | |
| 28 | 34.1659 | 4.164 | 1.84139 | 24.56 |
| 29 | 104.3918 | 0.156 | | |
| 30 | 28.3734 | 6.969 | 1.43875 | 94.93 |
| 31 | ∞ | 2.000 | 1.88300 | 40.76 |
| 32 | 25.5927 | 14.474 | | |
| 33 | 18.8530 | 5.958 | 1.49700 | 81.54 |
| 34 | −103.8817 | 0.250 | | |
| 35 | 151.7393 | 1.202 | 1.84661 | 23.78 |
| 36 | 11.6858 | 8.194 | 1.65160 | 58.55 |
| 37 | −57.5361 | 0.606 | | |
| 38 | −33.7794 | 1.371 | 1.88300 | 40.76 |
| 39 | 18.9622 | 9.054 | 1.54814 | 45.79 |
| 40 | −16.1173 | 0.392 | | |
| 41 | −15.0152 | 1.248 | 1.83481 | 42.71 |
| 42 | −80.4952 | 1.617 | | |
| 43 | 57.7359 | 4.667 | 1.84661 | 23.78 |
| 44 | −70.2305 | 0.000 | | |
| 45 | ∞ | 2.490 | 1.51632 | 64.00 |
| 46 | ∞ | 30.213 | | |

*Aspherical Surface

TABLE 8

Example 3: Data Related to Zoom

| Item (d line) | Wide Angle End | Telephoto End |
|---|---|---|
| Zoom Ratio | 1.0 | 2.8 |
| f' | 16.00 | 44.81 |
| Bf | 31.86 | 31.86 |
| FNo. | 2.65 | 2.65 |
| 2ω[°] | 91.83 | 37.85 |
| Variable Distance 16 | 2.000 | 50.595 |
| Variable Distance 22 | 36.156 | 5.352 |
| Variable Distance 24 | 19.759 | 1.968 |

TABLE 9

Example 3: Aspherical Surface Coefficients

| Surface Number | 3 |
|---|---|
| KA | 1.000000E+00 |
| A3 | −8.057230E−06 |
| A4 | 3.581432E−06 |
| A5 | −9.816251E−08 |
| A6 | 3.963765E−09 |
| A7 | −2.754498E−11 |
| A8 | −6.689182E−13 |
| A9 | 2.902062E−15 |
| A10 | 2.333707E−16 |
| A11 | 4.493514E−18 |
| A12 | 6.894495E−20 |
| A13 | 9.188327E−22 |

TABLE 9-continued

Example 3: Aspherical Surface Coefficients

| Surface Number | 3 |
|---|---|
| A14 | 1.129623E−23 |
| A15 | 1.316721E−25 |
| A16 | 1.471641E−27 |
| A17 | 1.575295E−29 |
| A18 | 1.587841E−31 |
| A19 | 1.430705E−33 |
| A20 | 9.530987E−36 |

Example 4

Figure 4:
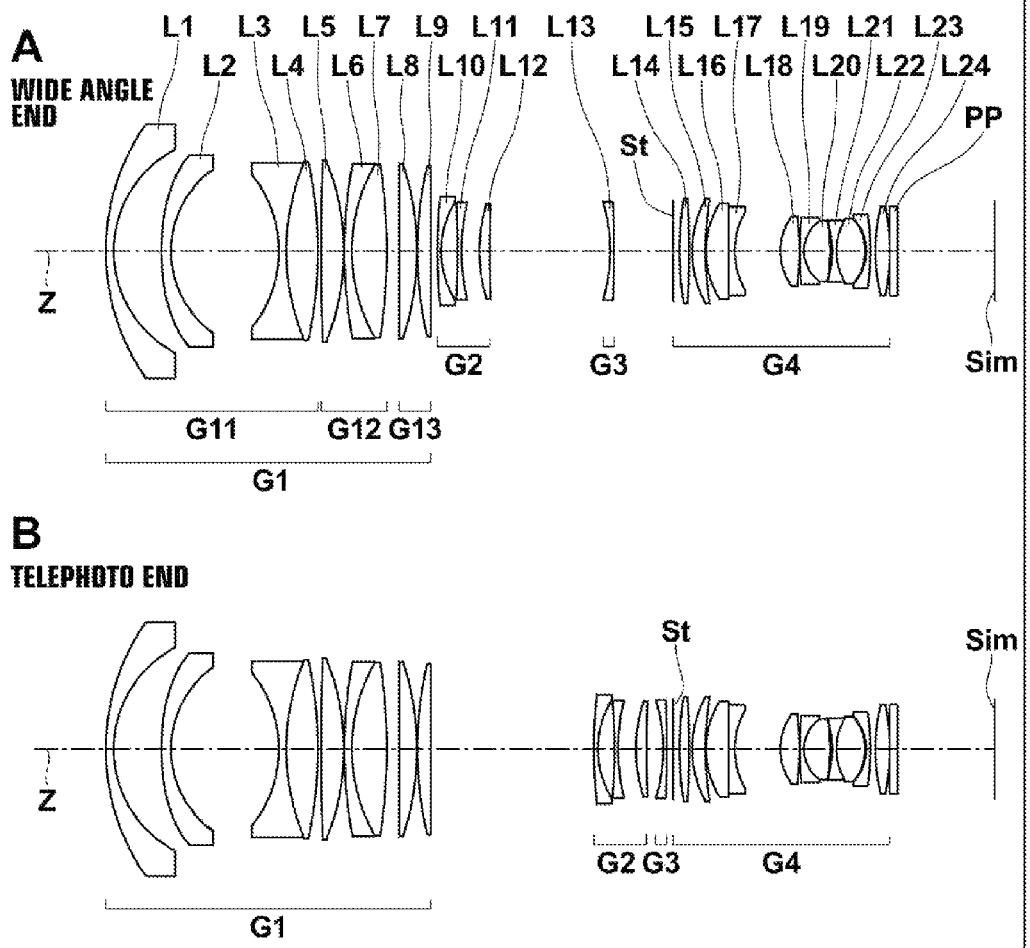
FIG. 4 is a collection of diagrams that illustrate the lens configuration of a zoom lens according to Example 4 of the present invention.

FIG. 4 illustrates the arrangements of lens groups of a zoom lens according to Example 4 at the wide angle end and at the telephoto end.

Table 10 shows basic lens data of the zoom lens of Example 4. Table 11 shows data related to zoom of the zoom lens of Example 4. Table 12 shows aspherical surface data of the zoom lens of Example 4. A through H of FIG. 13 are diagrams that illustrate various aberrations of the zoom lens of Example 4.

TABLE 10

Example 4: Basic Lens Data

| Si (Surface Number) | Ri (Radius of Curvature) | Di (Distance) | ndj (Refractive Index) | vdj (Abbe's Number) |
|---|---|---|---|---|
| 1 | 69.7272 | 2.500 | 1.77250 | 49.60 |
| 2 | 36.2998 | 14.981 | | |
| *3 | 76.8466 | 3.000 | 1.71736 | 29.52 |
| 4 | 31.7073 | 33.857 | | |
| 5 | −38.6477 | 2.351 | 1.51404 | 53.01 |
| 6 | 72.4553 | 9.919 | 1.71676 | 54.52 |
| 7 | −133.1199 | 1.075 | | |
| 8 | 956.5654 | 7.074 | 1.49700 | 81.54 |
| 9 | −76.3360 | 0.153 | | |
| 10 | 146.1610 | 2.350 | 1.88300 | 40.76 |
| 11 | 54.7391 | 10.998 | 1.49700 | 81.54 |
| 12 | −176.7059 | 3.847 | | |
| 13 | ∞ | 5.584 | 1.49700 | 81.54 |
| 14 | −89.4220 | 0.150 | | |
| 15 | 118.1062 | 4.258 | 1.74359 | 53.31 |
| 16 | ∞ | Variable Distance 16 | | |
| 17 | 165.3946 | 1.200 | 1.73735 | 53.93 |
| 18 | 29.5050 | 5.192 | | |
| 19 | −218.2346 | 1.200 | 1.57313 | 58.75 |
| 20 | 64.7617 | 5.630 | | |
| 21 | 49.3403 | 3.279 | 1.74373 | 28.17 |
| 22 | 320.7702 | Variable Distance 22 | | |
| 23 | −54.0614 | 1.200 | 1.49700 | 81.54 |
| 24 | −443.2194 | Variable Distance 24 | | |
| 25 | ∞ (Aperture Stop) | 2.000 | | |
| 26 | 107.0968 | 2.976 | 1.81600 | 46.62 |
| 27 | −272.9713 | 1.001 | | |
| 28 | 34.2014 | 4.177 | 1.84139 | 24.56 |
| 29 | 103.6967 | 0.156 | | |
| 30 | 28.7651 | 7.086 | 1.43875 | 94.93 |
| 31 | ∞ | 2.000 | 1.88300 | 40.76 |
| 32 | 25.5778 | 14.261 | | |
| 33 | 18.8999 | 5.963 | 1.49700 | 81.54 |
| 34 | −104.3511 | 0.250 | | |
| 35 | 147.3058 | 1.202 | 1.84661 | 23.78 |
| 36 | 11.7114 | 8.208 | 1.65160 | 58.55 |
| 37 | −57.4107 | 0.600 | | |
| 38 | −33.8701 | 1.371 | 1.88300 | 40.76 |
| 39 | 19.1249 | 9.018 | 1.54814 | 45.79 |
| 40 | −16.1147 | 0.375 | | |
| 41 | −15.0564 | 1.247 | 1.83481 | 42.71 |
| 42 | −81.5615 | 1.596 | | |
| 43 | 58.2406 | 4.513 | 1.84661 | 23.78 |
| 44 | −72.0276 | 0.000 | | |
| 45 | ∞ | 2.490 | 1.51632 | 64.00 |
| 46 | ∞ | 30.483 | | |

*Aspherical Surface

TABLE 11

Example 4: Data Related to Zoom

| Item (d line) | Wide Angle End | Telephoto End |
|---|---|---|
| Zoom Ratio | 1.0 | 2.8 |
| f | 16.00 | 44.81 |
| Bf | 32.13 | 32.13 |
| FNo. | 2.64 | 2.64 |
| 2ω[°] | 91.83 | 37.83 |
| Variable Distance 16 | 2.000 | 51.275 |
| Variable Distance 22 | 37.840 | 5.187 |
| Variable Distance 24 | 18.590 | 1.968 |

TABLE 12

Example 4: Aspherical Surface Coefficients

| Surface Number | 3 |
|---|---|
| KA | 1.000000E+00 |
| A3 | −8.722002E−06 |
| A4 | 3.661445E−06 |
| A5 | −9.859539E−08 |
| A6 | 3.955822E−09 |
| A7 | −2.754342E−11 |
| A8 | −6.677827E−13 |
| A9 | 2.919501E−15 |
| A10 | 2.335228E−16 |
| A11 | 4.493999E−18 |
| A12 | 6.893300E−20 |
| A13 | 9.185005E−22 |
| A14 | 1.129051E−23 |
| A15 | 1.315898E−25 |
| A16 | 1.470564E−27 |
| A17 | 1.573970E−29 |
| A18 | 1.586279E−31 |
| A19 | 1.428919E−33 |
| A20 | 9.511023E−36 |

Example 5

Figure 5:
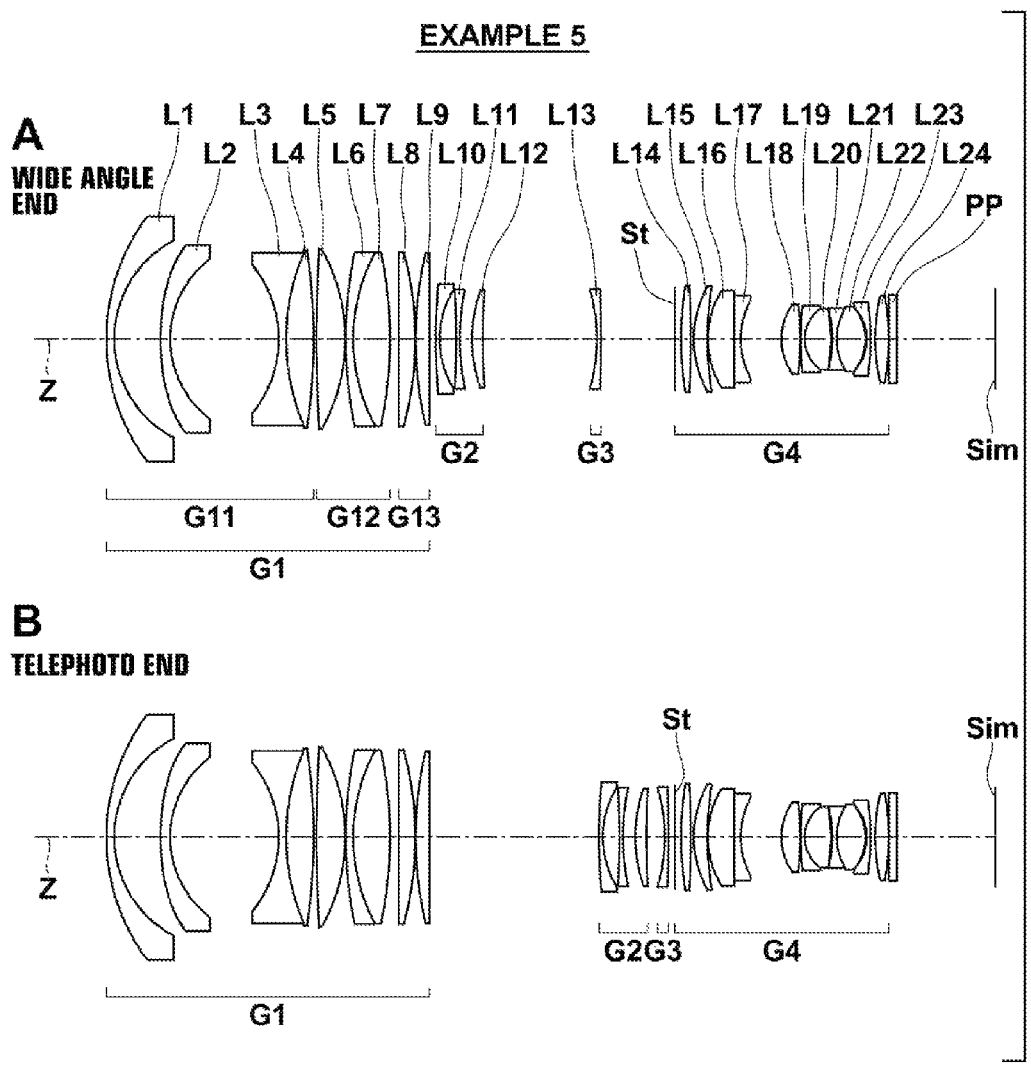
FIG. 5 is a collection of diagrams that illustrate the lens configuration of a zoom lens according to Example 5 of the present invention.

FIG. 5 illustrates the arrangements of lens groups of a zoom lens according to Example 5 at the wide angle end and at the telephoto end.

Table 13 shows basic lens data of the zoom lens of Example 5. Table 14 shows data related to zoom of the zoom lens of Example 5. Table 15 shows aspherical surface data of the zoom lens of Example 4. A through H of FIG. 14 are diagrams that illustrate various aberrations of the zoom lens of Example 5.

TABLE 13

Example 5: Basic Lens Data

| Si (Surface Number) | Ri (Radius of Curvature) | Di (Distance) | ndj (Refractive Index) | vdj (Abbe's Number) |
|---|---|---|---|---|
| 1 | 64.6230 | 2.500 | 1.78974 | 49.03 |
| 2 | 35.3715 | 14.598 | | |
| *3 | 83.2567 | 3.000 | 1.71736 | 29.52 |
| 4 | 31.6880 | 34.190 | | |
| 5 | −37.0492 | 2.351 | 1.55688 | 47.99 |
| 6 | 69.7934 | 8.558 | 1.66978 | 46.74 |
| 7 | −200.7063 | 1.000 | | |
| 8 | 493.2329 | 9.053 | 1.49700 | 81.54 |
| 9 | −57.9945 | 0.153 | | |
| 10 | 136.6891 | 2.350 | 1.88300 | 40.76 |
| 11 | 57.6224 | 11.609 | 1.49700 | 81.54 |
| 12 | −131.4761 | 2.749 | | |
| 13 | ∞ | 5.166 | 1.49700 | 81.54 |
| 14 | −107.1222 | 0.150 | | |
| 15 | 120.3617 | 4.332 | 1.74734 | 53.27 |
| 16 | ∞ | Variable Distance 16 | | |
| 17 | 200.7794 | 1.200 | 1.73843 | 54.16 |
| 18 | 29.9830 | 5.170 | | |
| 19 | −307.2689 | 1.201 | 1.57401 | 62.15 |
| 20 | 77.8391 | 3.840 | | |
| 21 | 46.4870 | 3.528 | 1.72840 | 28.64 |
| 22 | 277.7492 | Variable Distance 22 | | |
| 23 | −54.8659 | 1.200 | 1.49700 | 81.54 |
| 24 | −505.0282 | Variable Distance 24 | | |
| 25 | ∞ (Aperture Stop) | 2.000 | | |
| 26 | 106.9126 | 3.037 | 1.81600 | 46.62 |
| 27 | −348.1424 | 1.001 | | |
| 28 | 34.6856 | 4.252 | 1.84139 | 24.56 |
| 29 | 99.4484 | 0.156 | | |
| 30 | 29.5599 | 8.298 | 1.43875 | 94.93 |
| 31 | ∞ | 2.000 | 1.88300 | 40.76 |
| 32 | 25.5481 | 12.816 | | |
| 33 | 18.9466 | 5.927 | 1.49700 | 81.54 |
| 34 | −105.9301 | 0.250 | | |
| 35 | 142.0797 | 1.202 | 1.84661 | 23.78 |
| 36 | 11.7515 | 8.194 | 1.65160 | 58.55 |
| 37 | −54.2362 | 0.543 | | |
| 38 | −34.0434 | 1.369 | 1.88300 | 40.76 |
| 39 | 19.1526 | 9.023 | 1.54814 | 45.79 |
| 40 | −16.0859 | 0.360 | | |
| 41 | −15.0703 | 1.247 | 1.83481 | 42.71 |
| 42 | −83.5461 | 1.441 | | |
| 43 | 57.5525 | 4.266 | 1.84661 | 23.78 |
| 44 | −76.0426 | 0.000 | | |
| 45 | ∞ | 2.490 | 1.51632 | 64.00 |
| 46 | ∞ | 31.101 | | |

*Aspherical Surface

TABLE 14

Example 5: Data Related to Zoom

| Item (d line) | Wide Angle End | Telephoto End |
|---|---|---|
| Zoom Ratio | 1.0 | 2.8 |
| f | 16.00 | 44.81 |
| Bf | 32.74 | 32.74 |
| FNo. | 2.65 | 2.65 |
| 2ω[°] | 91.82 | 37.82 |
| Variable Distance 16 | 2.000 | 53.479 |
| Variable Distance 22 | 35.918 | 5.751 |
| Variable Distance 24 | 23.272 | 1.960 |

TABLE 15

Example 5: Aspherical Surface Coefficients

| Surface Number | 3 |
|---|---|
| KA | 1.000000E+00 |
| A3 | −8.028537E−06 |
| A4 | 3.858002E−06 |
| A5 | −9.982085E−08 |
| A6 | 3.904131E−09 |
| A7 | −2.815188E−11 |
| A8 | −6.710508E−13 |
| A9 | 2.936930E−15 |
| A10 | 2.342559E−16 |
| A11 | 4.506490E−18 |
| A12 | 6.910065E−20 |
| A13 | 9.205020E−22 |
| A14 | 1.131281E−23 |
| A15 | 1.318271E−25 |
| A16 | 1.473011E−27 |
| A17 | 1.576436E−29 |
| A18 | 1.588721E−31 |
| A19 | 1.431308E−33 |
| A20 | 9.534153E−36 |

Example 6

FIG. 6 illustrates the arrangements of lens groups of a zoom lens according to Example 6 at the wide angle end and at the telephoto end.

Table 16 shows basic lens data of the zoom lens of Example 6. Table 17 shows data related to zoom of the zoom lens of Example 6. Table 18 shows aspherical surface data of the zoom lens of Example 6. A through H of FIG. 15 are diagrams that illustrate various aberrations of the zoom lens of Example 6.

TABLE 16

Example 6: Basic Lens Data

| Si (Surface Number) | Ri (Radius of Curvature) | Di (Distance) | ndj (Refractive Index) | vdj (Abbe's Number) |
|---|---|---|---|---|
| 1 | 70.1642 | 2.500 | 1.80010 | 39.22 |
| 2 | 35.9681 | 12.868 | | |
| *3 | 71.0371 | 3.000 | 1.80001 | 25.00 |
| 4 | 32.6673 | 34.625 | | |
| 5 | −38.2698 | 2.351 | 1.49185 | 59.35 |
| 6 | 75.2321 | 11.649 | 1.66340 | 58.27 |
| 7 | −93.5909 | 1.000 | | |
| 8 | 885.2254 | 6.700 | 1.49700 | 81.54 |
| 9 | −87.7161 | 0.153 | | |
| 10 | 132.8142 | 2.350 | 1.88300 | 40.76 |
| 11 | 54.7989 | 10.864 | 1.49700 | 81.54 |
| 12 | −222.9344 | 4.489 | | |
| 13 | ∞ | 5.643 | 1.49700 | 81.54 |
| 14 | −89.2075 | 0.150 | | |
| 15 | 133.5956 | 3.901 | 1.72916 | 54.68 |
| 16 | ∞ | Variable Distance 16 | | |
| 17 | 168.7916 | 1.200 | 1.72296 | 55.35 |
| 18 | 29.7188 | 5.366 | | |
| 19 | −207.9603 | 1.200 | 1.54923 | 58.07 |
| 20 | 62.1428 | 5.395 | | |
| 21 | 48.6967 | 3.341 | 1.75072 | 27.90 |
| 22 | 292.6162 | Variable Distance 22 | | |
| 23 | −53.0416 | 1.200 | 1.49700 | 81.54 |
| 24 | −647.6773 | Variable Distance 24 | | |
| 25 | ∞ (Aperture Stop) | 2.000 | | |
| 26 | 104.5142 | 3.013 | 1.81600 | 46.62 |
| 27 | −272.8281 | 1.001 | | |
| 28 | 34.1968 | 4.185 | 1.84139 | 24.56 |

TABLE 16-continued

Example 6: Basic Lens Data

| Si (Surface Number) | Ri (Radius of Curvature) | Di (Distance) | ndj (Refractive Index) | vdj (Abbe's Number) |
|---|---|---|---|---|
| 29 | 107.0891 | 0.156 | | |
| 30 | 28.7635 | 6.472 | 1.43875 | 94.93 |
| 31 | ∞ | 2.000 | 1.88300 | 40.76 |
| 32 | 25.6580 | 15.770 | | |
| 33 | 18.8143 | 6.186 | 1.49700 | 81.54 |
| 34 | −106.5262 | 0.250 | | |
| 35 | 146.0161 | 1.202 | 1.84661 | 23.78 |
| 36 | 11.7041 | 8.201 | 1.65160 | 58.55 |
| 37 | −55.9370 | 0.579 | | |
| 38 | −33.8350 | 1.369 | 1.88300 | 40.76 |
| 39 | 19.9998 | 8.831 | 1.54814 | 45.79 |
| 40 | −16.1330 | 0.392 | | |
| 41 | −15.0283 | 1.248 | 1.83481 | 42.71 |
| 42 | −80.4046 | 1.451 | | |
| 43 | 56.7494 | 4.424 | 1.84661 | 23.78 |
| 44 | −84.8917 | 0.000 | | |
| 45 | ∞ | 2.490 | 1.51632 | 64.00 |
| 46 | ∞ | 29.754 | | |

*Aspherical Surface

TABLE 17

Example 6: Data Related to Zoom

| Item (d line) | Wide Angle End | Telephoto End |
|---|---|---|
| Zoom Ratio | 1.0 | 2.8 |
| f | 16.01 | 44.82 |
| Bf | 31.40 | 31.40 |
| FNo. | 2.64 | 2.64 |
| 2ω[°] | 91.84 | 37.84 |
| Variable Distance 16 | 2.000 | 51.576 |
| Variable Distance 22 | 37.803 | 5.067 |
| Variable Distance 24 | 19.340 | 2.500 |

TABLE 18

Example 6: Aspherical Surface Coefficients

| Surface Number | 3 |
|---|---|
| KA | 1.000000E+00 |
| A3 | −9.478749E−06 |
| A4 | 3.429214E−06 |
| A5 | −9.984211E−08 |
| A6 | 3.963807E−09 |
| A7 | −2.730521E−11 |
| A8 | −6.647467E−13 |
| A9 | 2.951160E−15 |
| A10 | 2.338501E−16 |
| A11 | 4.497629E−18 |
| A12 | 6.897615E−20 |
| A13 | 9.190300E−22 |
| A14 | 1.129701E−23 |
| A15 | 1.316682E−25 |
| A16 | 1.471491E−27 |
| A17 | 1.575040E−29 |
| A18 | 1.587489E−31 |
| A19 | 1.430265E−33 |
| A20 | 9.525775E−36 |

Example 7

Figure 7:
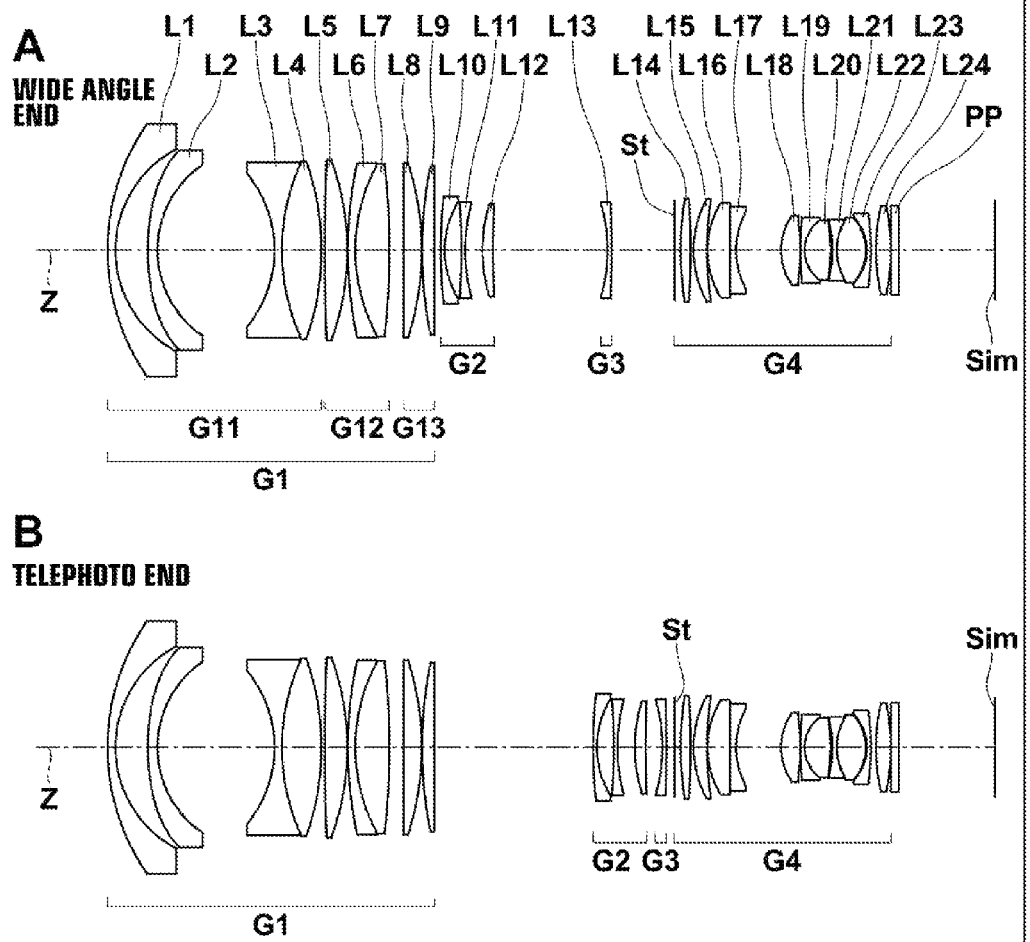
FIG. 7 is a collection of diagrams that illustrate the lens configuration of a zoom lens according to Example 7 of the present invention.

FIG. 7 illustrates the arrangements of lens groups of a zoom lens according to Example 7 at the wide angle end and at the telephoto end.

Table 19 shows basic lens data of the zoom lens of Example 7. Table 20 shows data related to zoom of the zoom lens of Example 7. Table 21 shows aspherical surface data of the zoom lens of Example 7. A through H of FIG. 16 are diagrams that illustrate various aberrations of the zoom lens of Example 7.

TABLE 19

Example 7: Basic Lens Data

| Si (Surface Number) | Ri (Radius of Curvature) | Di (Distance) | ndj (Refractive Index) | vdj (Abbe's Number) |
|---|---|---|---|---|
| 1 | 70.0579 | 2.500 | 1.77219 | 49.41 |
| 2 | 36.2423 | 10.214 | | |
| *3 | 76.5478 | 3.000 | 1.70164 | 29.92 |
| 4 | 32.8322 | 36.894 | | |
| 5 | −37.8913 | 2.351 | 1.50613 | 54.82 |
| 6 | 67.0982 | 12.438 | 1.59432 | 61.37 |
| 7 | −84.2919 | 1.001 | | |
| 8 | 673.8583 | 7.169 | 1.49700 | 81.54 |
| 9 | −81.8695 | 0.153 | | |
| 10 | 130.3846 | 2.350 | 1.88300 | 40.76 |
| 11 | 56.9430 | 10.719 | 1.49700 | 81.54 |
| 12 | −242.0473 | 4.447 | | |
| 13 | ∞ | 5.734 | 1.49700 | 81.54 |
| 14 | −90.3235 | 0.150 | | |
| 15 | 138.1575 | 3.878 | 1.72795 | 55.08 |
| 16 | ∞ | Variable Distance 16 | | |
| 17 | 164.9341 | 1.200 | 1.71879 | 55.27 |
| 18 | 29.5396 | 5.314 | | |
| 19 | −192.7389 | 1.200 | 1.56944 | 48.61 |
| 20 | 59.8216 | 5.443 | | |
| 21 | 49.1912 | 3.338 | 1.76866 | 26.77 |
| 22 | 309.5695 | Variable Distance 22 | | |
| 23 | −53.7796 | 1.200 | 1.49700 | 81.54 |
| 24 | −547.9610 | Variable Distance 24 | | |
| 25 | ∞ (Aperture Stop) | 2.000 | | |
| 26 | 107.1775 | 3.072 | 1.81600 | 46.62 |
| 27 | −273.1519 | 1.001 | | |
| 28 | 34.2168 | 4.178 | 1.84139 | 24.56 |
| 29 | 104.0250 | 0.156 | | |
| 30 | 28.5169 | 7.004 | 1.43875 | 94.93 |
| 31 | ∞ | 2.000 | 1.88300 | 40.76 |
| 32 | 25.5786 | 14.155 | | |
| 33 | 18.8788 | 6.007 | 1.49700 | 81.54 |
| 34 | −104.2122 | 0.250 | | |
| 35 | 152.0637 | 1.202 | 1.84661 | 23.78 |
| 36 | 11.7126 | 8.178 | 1.65160 | 58.55 |
| 37 | −58.0472 | 0.602 | | |
| 38 | −34.0208 | 1.371 | 1.88300 | 40.76 |
| 39 | 19.0287 | 9.060 | 1.54814 | 45.79 |
| 40 | −16.0721 | 0.375 | | |
| 41 | −15.0221 | 1.248 | 1.83481 | 42.71 |
| 42 | −82.2867 | 1.602 | | |
| 43 | 59.6133 | 4.769 | 1.84661 | 23.78 |
| 44 | −67.4261 | 0.000 | | |
| 45 | ∞ | 2.490 | 1.51632 | 64.00 |
| 46 | ∞ | 30.260 | | |

*Aspherical Surface

TABLE 20

Example 7: Data Related to Zoom

| Item (d line) | Wide Angle End | Telephoto End |
| --- | --- | --- |
| Zoom Ratio | 1.0 | 2.8 |
| f | 16.00 | 44.81 |
| Bf | 31.90 | 31.90 |
| FNo. | 2.65 | 2.65 |
| 2ω[°] | 91.82 | 37.84 |
| Variable Distance 16 | 2.000 | 50.066 |
| Variable Distance 22 | 36.097 | 5.333 |
| Variable Distance 24 | 19.861 | 2.559 |

TABLE 21

Example 7: Aspherical Surface Coefficients

| Surface Number | 3 |
| --- | --- |
| KA | 1.000000E+00 |
| A3 | −9.583171E−06 |
| A4 | 3.495978E−06 |
| A5 | −1.000529E−07 |
| A6 | 3.946026E−09 |
| A7 | −2.761119E−11 |
| A8 | −6.682743E−13 |
| A9 | 2.918938E−15 |
| A10 | 2.336117E−16 |
| A11 | 4.496398E−18 |
| A12 | 6.897694E−20 |
| A13 | 9.191739E−22 |
| A14 | 1.129979E−23 |
| A15 | 1.317087E−25 |
| A16 | 1.472014E−27 |
| A17 | 1.575672E−29 |
| A18 | 1.588220E−31 |
| A19 | 1.431085E−33 |
| A20 | 9.534770E−36 |

Example 8

Figure 8:
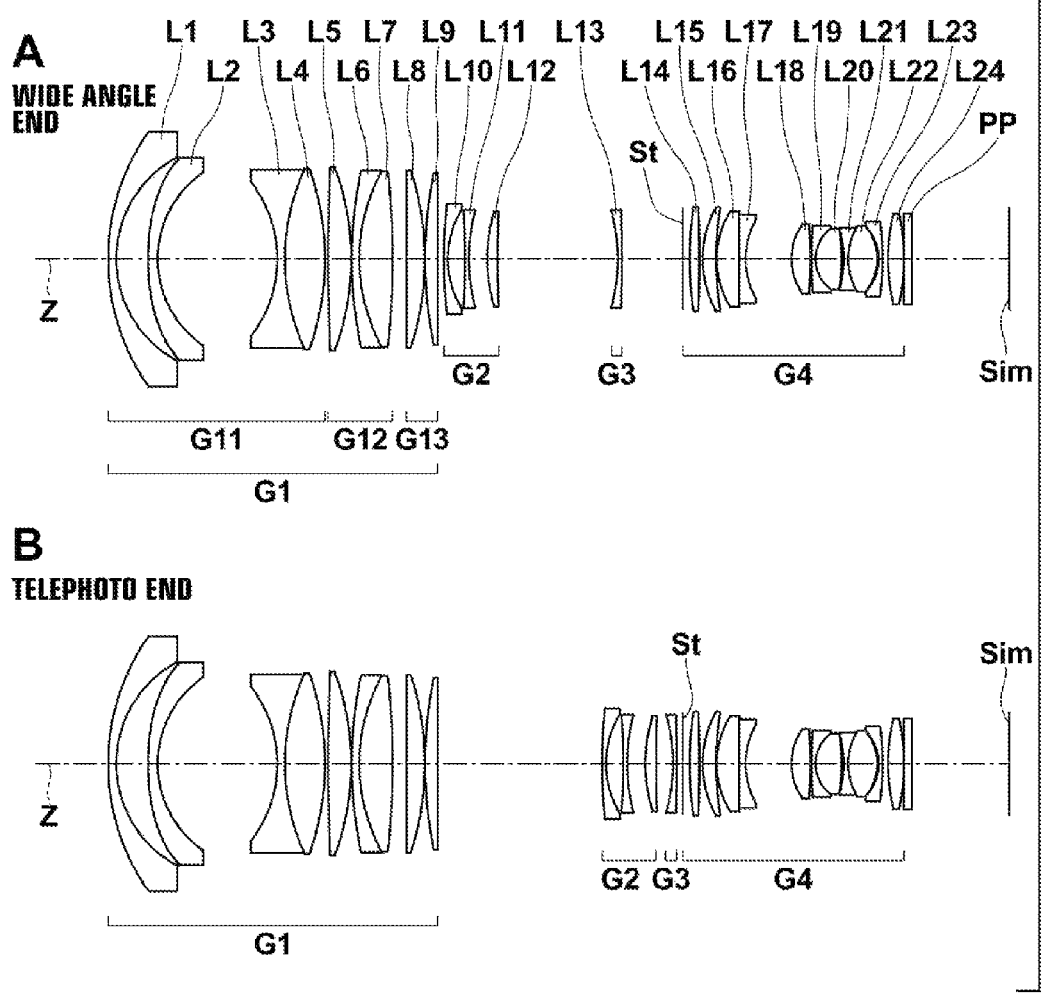
FIG. 8 is a collection of diagrams that illustrate the lens configuration of a zoom lens according to Example 8 of the present invention.

FIG. 8 illustrates the arrangements of lens groups of a zoom lens according to Example 8 at the wide angle end and at the telephoto end.

Table 22 shows basic lens data of the zoom lens of Example 8. Table 23 shows data related to zoom of the zoom lens of Example 8. Table 24 shows aspherical surface data of the zoom lens of Example 8. A through H of FIG. 17 are diagrams that illustrate various aberrations of the zoom lens of Example 8.

TABLE 22

Example 8: Basic Lens Data

| Si (Surface Number) | Ri (Radius of Curvature) | Di (Distance) | ndj (Refractive Index) | vdj (Abbe's Number) |
| --- | --- | --- | --- | --- |
| 1 | 68.9604 | 2.500 | 1.77251 | 49.01 |
| 2 | 35.9797 | 9.830 | | |
| *3 | 75.1989 | 3.000 | 1.70531 | 31.24 |
| 4 | 32.6579 | 37.081 | | |
| 5 | −38.9664 | 2.351 | 1.57624 | 40.71 |
| 6 | 66.9356 | 12.394 | 1.66582 | 42.75 |
| 7 | −83.9221 | 1.001 | | |
| 8 | 682.4675 | 7.130 | 1.49700 | 81.54 |
| 9 | −81.8401 | 0.153 | | |
| 10 | 131.5226 | 2.350 | 1.88300 | 40.76 |
| 11 | 57.0713 | 10.338 | 1.49700 | 81.54 |
| 12 | −243.6474 | 4.376 | | |
| 13 | ∞ | 5.538 | 1.49700 | 81.54 |
| 14 | −90.2704 | 0.150 | | |
| 15 | 136.2595 | 3.811 | 1.72849 | 55.08 |
| 16 | ∞ | Variable Distance 16 | | |
| 17 | 169.8939 | 1.200 | 1.70180 | 56.41 |
| 18 | 29.6420 | 5.377 | | |
| 19 | −186.4588 | 1.200 | 1.55412 | 54.54 |
| 20 | 60.3951 | 5.637 | | |
| 21 | 49.4416 | 3.268 | 1.75285 | 27.79 |
| 22 | 289.5730 | Variable Distance 22 | | |
| 23 | −55.0677 | 1.200 | 1.49700 | 81.54 |
| 24 | −543.0122 | Variable Distance 24 | | |
| 25 | ∞ (Aperture Stop) | 2.000 | | |
| 26 | 107.7427 | 3.077 | 1.81600 | 46.62 |
| 27 | −273.5605 | 1.001 | | |
| 28 | 34.1779 | 4.178 | 1.84139 | 24.56 |
| 29 | 104.1767 | 0.156 | | |
| 30 | 28.5567 | 6.967 | 1.43875 | 94.93 |
| 31 | ∞ | 2.000 | 1.88300 | 40.76 |
| 32 | 25.6116 | 14.181 | | |
| 33 | 18.8878 | 5.956 | 1.49700 | 81.54 |
| 34 | −103.1436 | 0.250 | | |
| 35 | 151.0467 | 1.202 | 1.84661 | 23.78 |
| 36 | 11.7253 | 8.140 | 1.65160 | 58.55 |
| 37 | −58.2364 | 0.607 | | |
| 38 | −33.9810 | 1.371 | 1.88300 | 40.76 |
| 39 | 19.0361 | 9.050 | 1.54814 | 45.79 |
| 40 | −16.0831 | 0.383 | | |
| 41 | −15.0113 | 1.248 | 1.83481 | 42.71 |
| 42 | −83.3657 | 1.672 | | |
| 43 | 60.1489 | 4.942 | 1.84661 | 23.78 |
| 44 | −65.9877 | 0.000 | | |
| 45 | ∞ | 2.490 | 1.51632 | 64.00 |
| 46 | ∞ | 30.104 | | |

*Aspherical Surface

TABLE 23

Example 8: Data Related to Zoom

| Item (d line) | Wide Angle End | Telephoto End |
| --- | --- | --- |
| Zoom Ratio | 1.0 | 2.8 |
| f | 16.00 | 44.81 |
| Bf | 31.75 | 31.75 |
| FNo. | 2.65 | 2.65 |
| 2ω[°] | 91.82 | 37.85 |
| Variable Distance 16 | 2.000 | 51.054 |
| Variable Distance 22 | 37.271 | 5.271 |
| Variable Distance 24 | 19.018 | 1.963 |

TABLE 24

Example 8: Aspherical Surface Coefficients

| Surface Number | 3 |
| --- | --- |
| KA | 1.000000E+00 |
| A3 | −9.409151E−06 |
| A4 | 3.493448E−06 |
| A5 | −1.001181E−07 |
| A6 | 3.943622E−09 |
| A7 | −2.765256E−11 |
| A8 | −6.687414E−13 |
| A9 | 2.914733E−15 |
| A10 | 2.335778E−16 |
| A11 | 4.496133E−18 |

TABLE 24-continued

Example 8: Aspherical Surface Coefficients

| Surface Number | 3 |
|---|---|
| A12 | 6.897478E−20 |
| A13 | 9.191543E−22 |
| A14 | 1.129959E−23 |
| A15 | 1.317065E−25 |
| A16 | 1.471988E−27 |
| A17 | 1.575642E−29 |
| A18 | 1.588185E−31 |
| A19 | 1.431045E−33 |
| A20 | 9.534323E−36 |

Example 9

Figure 9:
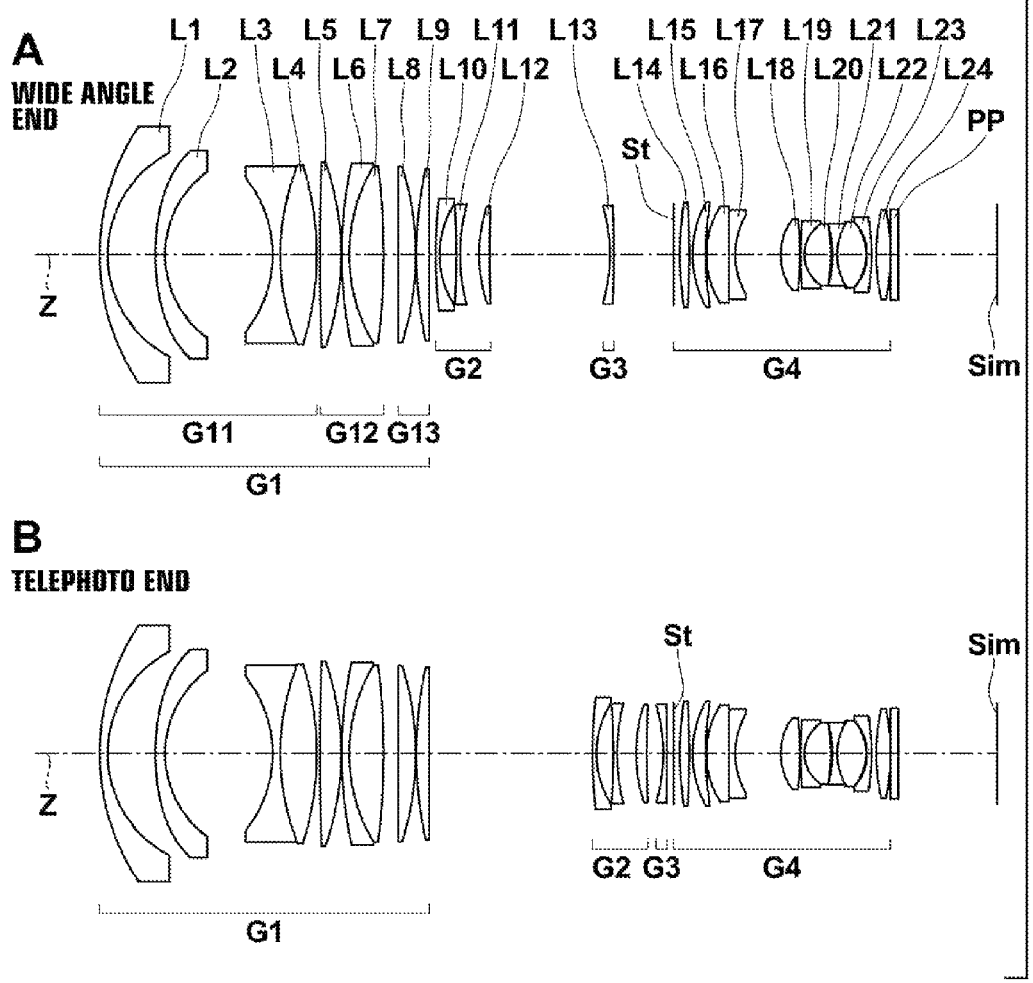
FIG. 9 is a collection of diagrams that illustrate the lens configuration of a zoom lens according to Example 9 of the present invention.

FIG. 9 illustrates the arrangements of lens groups of a zoom lens according to Example 9 at the wide angle end and at the telephoto end.

Table 25 shows basic lens data of the zoom lens of Example 9. Table 26 shows data related to zoom of the zoom lens of Example 9. Table 27 shows aspherical surface data of the zoom lens of Example 9. A through H of FIG. 18 are diagrams that illustrate various aberrations of the zoom lens of Example 9.

TABLE 25

Example 9: Basic Lens Data

| Si (Surface Number) | Ri (Radius of Curvature) | Di (Distance) | ndj (Refractive Index) | vdj (Abbe's Number) |
|---|---|---|---|---|
| 1 | 71.9586 | 2.500 | 1.77250 | 49.60 |
| 2 | 36.1245 | 14.901 | | |
| *3 | 78.0794 | 3.000 | 1.71736 | 29.52 |
| 4 | 32.3222 | 33.592 | | |
| 5 | −38.2381 | 2.351 | 1.51742 | 52.43 |
| 6 | 75.0400 | 11.387 | 1.69680 | 55.53 |
| 7 | −92.3604 | 1.000 | | |
| 8 | 908.8838 | 6.613 | 1.49700 | 81.54 |
| 9 | −87.2167 | 0.153 | | |
| 10 | 133.8313 | 2.350 | 1.88300 | 40.76 |
| 11 | 54.6580 | 10.728 | 1.49700 | 81.54 |
| 12 | −227.7102 | 4.515 | | |
| 13 | ∞ | 5.539 | 1.49700 | 81.54 |
| 14 | −90.2733 | 0.150 | | |
| 15 | 127.1125 | 4.023 | 1.72916 | 54.68 |
| 16 | ∞ | Variable Distance 16 | | |
| 17 | 152.3952 | 1.200 | 1.72916 | 54.68 |
| 18 | 29.4212 | 5.255 | | |
| 19 | −224.4541 | 1.200 | 1.56907 | 71.30 |
| 20 | 62.5176 | 5.928 | | |
| 21 | 48.8107 | 3.279 | 1.71736 | 29.52 |
| 22 | 309.7564 | Variable Distance 22 | | |
| 23 | −53.0405 | 1.200 | 1.49700 | 81.54 |
| 24 | −398.1257 | Variable Distance 24 | | |
| 25 | ∞ (Aperture Stop) | 2.000 | | |
| 26 | 107.0313 | 2.944 | 1.81600 | 46.62 |
| 27 | −284.4562 | 1.001 | | |
| 28 | 34.1526 | 4.161 | 1.84139 | 24.56 |
| 29 | 104.9592 | 0.156 | | |
| 30 | 28.5818 | 7.037 | 1.43875 | 94.93 |
| 31 | ∞ | 2.000 | 1.88300 | 40.76 |
| 32 | 25.5163 | 14.145 | | |
| 33 | 18.8760 | 5.972 | 1.49700 | 81.54 |
| 34 | −103.8754 | 0.250 | | |
| 35 | 151.3530 | 1.202 | 1.84661 | 23.78 |

TABLE 25-continued

Example 9: Basic Lens Data

| Si (Surface Number) | Ri (Radius of Curvature) | Di (Distance) | ndj (Refractive Index) | vdj (Abbe's Number) |
|---|---|---|---|---|
| 36 | 11.6950 | 8.166 | 1.65160 | 58.55 |
| 37 | −58.5958 | 0.613 | | |
| 38 | −33.9526 | 1.371 | 1.88300 | 40.76 |
| 39 | 18.9300 | 9.074 | 1.54814 | 45.79 |
| 40 | −16.0865 | 0.374 | | |
| 41 | −15.0366 | 1.248 | 1.83481 | 42.71 |
| 42 | −80.5008 | 1.494 | | |
| 43 | 58.5774 | 4.455 | 1.84661 | 23.78 |
| 44 | −69.0070 | 0.000 | | |
| 45 | ∞ | 2.490 | 1.51632 | 64.00 |
| 46 | ∞ | 30.822 | | |

*Aspherical Surface

TABLE 26

Example 9: Data Related to Zoom

| Item (d line) | Wide Angle End | Telephoto End |
|---|---|---|
| Zoom Ratio | 1.0 | 2.8 |
| f | 16.00 | 44.81 |
| Bf | 32.46 | 32.46 |
| FNo. | 2.64 | 2.64 |
| 2ω[°] | 91.84 | 37.84 |
| Variable Distance 16 | 2.005 | 51.009 |
| Variable Distance 22 | 37.567 | 5.193 |
| Variable Distance 24 | 18.618 | 1.989 |

TABLE 27

Example 9: Aspherical Surface Coefficients

| Surface Number | 3 |
|---|---|
| KA | 1.000000E+00 |
| A3 | −8.344591E−06 |
| A4 | 3.617715E−06 |
| A5 | −9.829526E−08 |
| A6 | 3.965605E−09 |
| A7 | −2.745813E−11 |
| A8 | −6.677557E−13 |
| A9 | 2.911158E−15 |
| A10 | 2.334014E−16 |
| A11 | 4.493082E−18 |
| A12 | 6.893333E−20 |
| A13 | 9.186511E−22 |
| A14 | 1.129386E−23 |
| A15 | 1.316440E−25 |
| A16 | 1.471324E−27 |
| A17 | 1.574950E−29 |
| A18 | 1.587474E−31 |
| A19 | 1.430322E−33 |
| A20 | 9.527025E−36 |

TABLE 28

| Number | Conditional Formula | Example 1 | Example 2 | Example 3 | Example 4 | Example 5 | Example 6 | Example 7 | Example 8 | Example 9 |
|---|---|---|---|---|---|---|---|---|---|---|
| (1) | f12/fw | 5.503 | 7.901 | 8.158 | 7.139 | 4.874 | 7.789 | 7.098 | 7.146 | 7.880 |
| (2) | f11/fw | −1.938 | −2.203 | −2.329 | −1.898 | −1.410 | −2.147 | −2.103 | −2.068 | −2.149 |
| (3) | D4/f1 | 0.763 | 0.898 | 0.748 | 0.732 | 0.745 | 0.746 | 0.808 | 0.799 | 0.727 |
| (4) | (R5 − R7)/R5 + R7) | −0.471 | −0.415 | −0.320 | −0.550 | −0.688 | −0.420 | −0.380 | −0.366 | −0.414 |
| (5) | ν2 | 29.52 | 29.52 | 29.52 | 29.52 | 29.52 | 25.00 | 29.92 | 31.24 | 29.52 |
| (6) | ν4 | 55.53 | 55.87 | 57.45 | 54.52 | 46.74 | 58.27 | 61.37 | 42.75 | 55.53 |

Note that FIG. 1 illustrates an example in which the optical member PP is provided between the lens system and the imaging surface. Alternatively, various filters such as low pass filters and filters that cut off specific wavelength bands may be provided among each of the lenses. As a further alternative, coatings that have the same functions as the various filters may be administered on the surfaces of the lenses.

Next, an imaging apparatus according to an embodiment of the present invention will be described. FIG. 19 is a diagram that schematically illustrates an imaging apparatus 10 according to the embodiment of the present invention that employs a zoom lens 1 according to an embodiment of the present invention. The imaging apparatus 10 may be a digital cinema camera, a surveillance camera, a video camera, an electronic still camera, or the like.

The imaging apparatus 10 illustrated in FIG. 19 is equipped with: the zoom lens 1; a filter 2 provided toward the image side of the zoom lens 1, an imaging device 3 that captures images of subjects focused by the zoom lens 1; a signal processing section 4 that processes signals output from the imaging device 3; a magnification control section 5 that changes the magnification of the zoom lens 1; and a focus control section 6 that performs focus adjustments. Note that lens groups are schematically illustrated in FIG. 19.

The zoom lens 1 consists of a first lens group G1 having a positive refractive power which is fixed while changing magnification, a second lens group G2 having a negative refractive power that moves while changing magnification, a third lens group G3 having a negative refractive power that moves while changing magnification, and a fourth lens group G4 having a positive refractive power which is fixed while changing magnification, provided in this order from the object side, that is, the left side of FIG. 19.

In the zoom lens 1, the second lens group G2 moves along the optical axis Z from the object side to the image side while changing magnification from the wide angle end to the telephoto end. The third lens group G3 also moves along the optical axis Z to correct movement of the imaging surface while changing magnification. The movements of the lens groups G2 and G3 are controlled by the magnification control section 5.

The first lens group G1 consists of a first lens subgroup G11 having a negative refractive power which is fixed during focusing operations, a second lens subgroup G12 having a positive refractive power that moves during focusing operations, and a third lens subgroup G13 having a positive refractive power which is fixed during focusing operations, provided in this order from the object side. Movement of the second lens subgroup G12 is controlled by the focus control section 6.

The imaging device 3 captures an optical image formed by the zoom lens 1 and outputs electrical signals. The imaging surface thereof is provided to match the imaging plane of the zoom lens 1. A CCD, a CMOS, or the like may be employed as the imaging device 3.

The imaging apparatus 10 is equipped with the zoom lens 1 of the present invention. Therefore, variations in angles of view during focusing operations can be prevented, variations in various aberrations during focusing operations can be suppressed, thereby enabling high quality imaging, and reductions in size and weight can be achieved.

The present invention has been described with reference to the embodiments and Examples thereof. However, the present invention is not limited to the embodiments and Examples described above, and various modifications are possible. For example, the values of the radii of curvature of each lens component, the distances among surfaces, the refractive indices, the Abbe's numbers, the aspherical surface coefficients, etc., are not limited to the numerical values indicated in connection with the Examples, and may be other values.

What is claimed is:

1. A zoom lens, substantially consisting of:
a first lens group having a positive refractive power, which is fixed while changing magnification;
a second lens group having a negative refractive power, which moves from an object side to an image side while changing magnification from a wide angle end to a telephoto end;
a third lens group having a negative refractive power, which corrects movement of an imaging surface while changing magnification; and
a fourth lens group having a positive refractive power, which is fixed while changing magnification, provided in this order from the object side;
the first lens group substantially consisting of: a first lens subgroup having a negative refractive power, which is fixed during focusing operations; a second lens subgroup having a positive refractive power, which moves during focusing operations; and a third lens subgroup having a positive refractive power, which is fixed during focusing operations, provided in this order from the object side;
the second lens subgroup substantially consisting of: a positive lens having a surface having a radius of curvature with a smaller absolute value toward the image side; and a cemented lens constituted by a negative lens toward the object side and a positive lens toward the image side, cemented together at a joint surface having a convex surface toward the object side, provided in this order from the magnification side;
the second lens subgroup satisfying the following conditional formula:

$$3.0 < f12/fw < 20.0 \quad (1)$$

wherein f12 is the focal length of the second lens subgroup, and fw is the focal length of the entire system at the wide angle end.

2. A zoom lens as defined in claim 1 that satisfies the following conditional formula:

$$4.0<f12/fw<10.0 \tag{1}'$$

3. An imaging apparatus comprising a zoom lens as defined in claim 1.

4. A zoom lens as defined in claim 1 that satisfies the following conditional formula:

$$-5.0<f11/fw<-0.5 \tag{2}$$

wherein f11 is the focal length of the first lens subgroup, and fw is the focal length of the entire system at the wide angle end.

5. A zoom lens as defined in claim 4 that satisfies the following conditional formula:

$$-3.0<f11/fw<-1.2 \tag{2}'$$

6. A zoom lens as defined in claim 1, wherein the first lens subgroup substantially consists of:
   a negative meniscus lens having a concave surface toward the image side;
   a negative meniscus lens having a concave surface toward the image side; and
   a cemented lens constituted by a biconcave lens toward the object side and a biconvex lens toward the image side, which are cemented together, provided in this order from the object side.

7. A zoom lens as defined in claim 6, wherein the biconvex lens that constitutes the cemented lens within the first lens subgroup satisfies the following conditional formula:

$$35.0<\nu d4<100.0 \tag{6}$$

wherein $\nu d4$ is the Abbe's number of the biconvex lens with respect to the d line.

8. A zoom lens as defined in claim 7 that satisfies the following conditional formula:

$$40.0<\nu d4<72.0 \tag{6}'$$

9. A zoom lens as defined in claim 8 that satisfies the following conditional formula:

$$40.0<\nu d4<60.0 \tag{6}''$$

10. A zoom lens as defined in claim 6, wherein the second meniscus lens from the object side within the first lens subgroup satisfies the following conditional formula:

$$20.0<\nu d2<35.0 \tag{5}$$

wherein $\nu d2$ is the Abbe's number of the second negative meniscus lens with respect to the d line.

11. A zoom lens as defined in claim 10 that satisfies the following conditional formula:

$$22.0<\nu d2<32.0 \tag{5}'$$

12. A zoom lens as defined in claim 6, wherein the cemented lens within the first lens subgroup satisfies the following conditional formula:

$$-1.0<(R5-R7)/(R5+R7)<-0.1 \tag{4}$$

wherein R5 is the radius of curvature of the surface of the cemented lens toward the object side, and R7 is the radius of curvature of the surface of the cemented lens toward the image side.

13. A zoom lens as defined in claim 12 that satisfies the following conditional formula:

$$-0.8<(R5-R7)/(R5+R7)<-0.25 \tag{4}'$$

14. A zoom lens as defined in claim 6, wherein the second meniscus lens from the object side within the first lens subgroup and the cemented lens within the first lens subgroup satisfy the following conditional formula:

$$0.60<D4/f1<2.0 \tag{3}$$

wherein D4 is the distance between the surfaces of the second negative meniscus lens and the cemented lens, and f1 is the focal length of the first lens group.

15. A zoom lens as defined in claim 14 that satisfies the following conditional formula:

$$0.70<D4/f1<1.0 \tag{3}'$$

* * * * *